United States Patent
Pazos et al.

(10) Patent No.: US 9,912,540 B2
(45) Date of Patent: Mar. 6, 2018

(54) SIGNALING OF REFRESH RATE FOR EFFICIENT DATA UPDATE IN DISTRIBUTED COMPUTING ENVIRONMENTS

(71) Applicant: QUALCOMM Incorporated, San Diego, CA (US)

(72) Inventors: Carlos Marcelo Dias Pazos, Carlsbad, CA (US); Nermeen Ahmed Bassiouny, San Diego, CA (US); Thadi Manjunath Nagaraj, San Diego, CA (US); Joseph Peter Barone, San Diego, CA (US); Jun Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 206 days.

(21) Appl. No.: 14/022,085

(22) Filed: Sep. 9, 2013

(65) Prior Publication Data
US 2014/0082147 A1    Mar. 20, 2014

Related U.S. Application Data

(60) Provisional application No. 61/703,188, filed on Sep. 19, 2012.

(51) Int. Cl.
*H04L 12/24* (2006.01)
*H04L 29/06* (2006.01)
*H04L 29/08* (2006.01)

(52) U.S. Cl.
CPC .......... *H04L 41/0896* (2013.01); *H04L 67/02* (2013.01); *H04L 67/28* (2013.01); *H04L 67/325* (2013.01); *H04L 67/42* (2013.01)

(58) Field of Classification Search
CPC ... H04L 41/0896; H04L 67/28; H04L 67/325; H04L 67/42; H04L 67/02
See application file for complete search history.

(56) References Cited

U.S. PATENT DOCUMENTS 6,115,747 A * 9/2000 Billings .................. H04L 12/44
709/231
7,676,585 B1 * 3/2010 Francke et al. ............... 709/229
(Continued)

FOREIGN PATENT DOCUMENTS

CN    102170422 A    8/2011
CN    102184253 A    9/2011
(Continued)

OTHER PUBLICATIONS

International Search Report and Written Opinion—PCT/US2013/058944—ISA/EPO—Dec. 5, 2013.

*Primary Examiner* — Dustin Nguyen
*Assistant Examiner* — Juan C Turriate Gastulo
(74) *Attorney, Agent, or Firm* — Norton Rose Fulbright LLP

(57) ABSTRACT

Distributed computing is disclosed in which a client device accesses a service announcement for a broadcast service in order to retrieve transport parameters describing a data transmission service. The client device obtains a refresh rate from the service description file, which is separate from the data transmission service, wherein the refresh rate relates to a frequency at which the data transmission service updates data in a data transmission provided by the data transmission service. The client device uses the transport parameters to access the data transmission to receive the data. Once the data is received, the client device will delay any subsequent access to the data transmission to get updated data for a delay time based at least in part on the refresh rate.

33 Claims, 11 Drawing Sheets

(56) References Cited

U.S. PATENT DOCUMENTS

| | | |
|---|---|---|
| 8,141,118 B2 * | 3/2012 | Regan et al. .................. 725/58 |
| 2002/0161767 A1 * | 10/2002 | Shapiro ............... G06F 17/3089 |
| 2005/0100045 A1 * | 5/2005 | Hunkeler .......... H04W 72/1231 370/465 |
| 2006/0085536 A1 * | 4/2006 | Meyer ................ G06F 11/3495 709/224 |
| 2006/0218227 A1 * | 9/2006 | Spear ............................ 709/203 |
| 2008/0104257 A1 | 5/2008 | Olston |
| 2008/0307301 A1 * | 12/2008 | Decker et al. ................ 715/241 |
| 2009/0164287 A1 | 6/2009 | Kies et al. |
| 2009/0313663 A1 | 12/2009 | Kitazato et al. |
| 2010/0037262 A1 | 2/2010 | Heuer |
| 2010/0057549 A1 * | 3/2010 | Boal ........................ 705/14.23 |
| 2010/0130122 A1 | 5/2010 | Sridhar et al. |
| 2012/0239785 A1 * | 9/2012 | Pazos ................ H04L 12/1881 709/219 |
| 2012/0309375 A1 | 12/2012 | Austin |
| 2013/0014006 A1 * | 1/2013 | Abellera et al. ............. 715/234 |

FOREIGN PATENT DOCUMENTS

| | | |
|---|---|---|
| EP | 1703700 A1 | 9/2006 |
| JP | 2000507365 A | 6/2000 |
| JP | 2006042326 A | 2/2006 |
| JP | 2010021988 A | 1/2010 |
| JP | 2010527211 A | 8/2010 |
| WO | WO-9735296 A1 | 9/1997 |
| WO | WO-0221300 A1 | 3/2002 |
| WO | WO-2007040910 A1 | 4/2007 |
| WO | WO-2008136764 A2 | 11/2008 |
| WO | WO-2009082727 A1 | 7/2009 |
| WO | WO-2012112164 A1 | 8/2012 |

\* cited by examiner

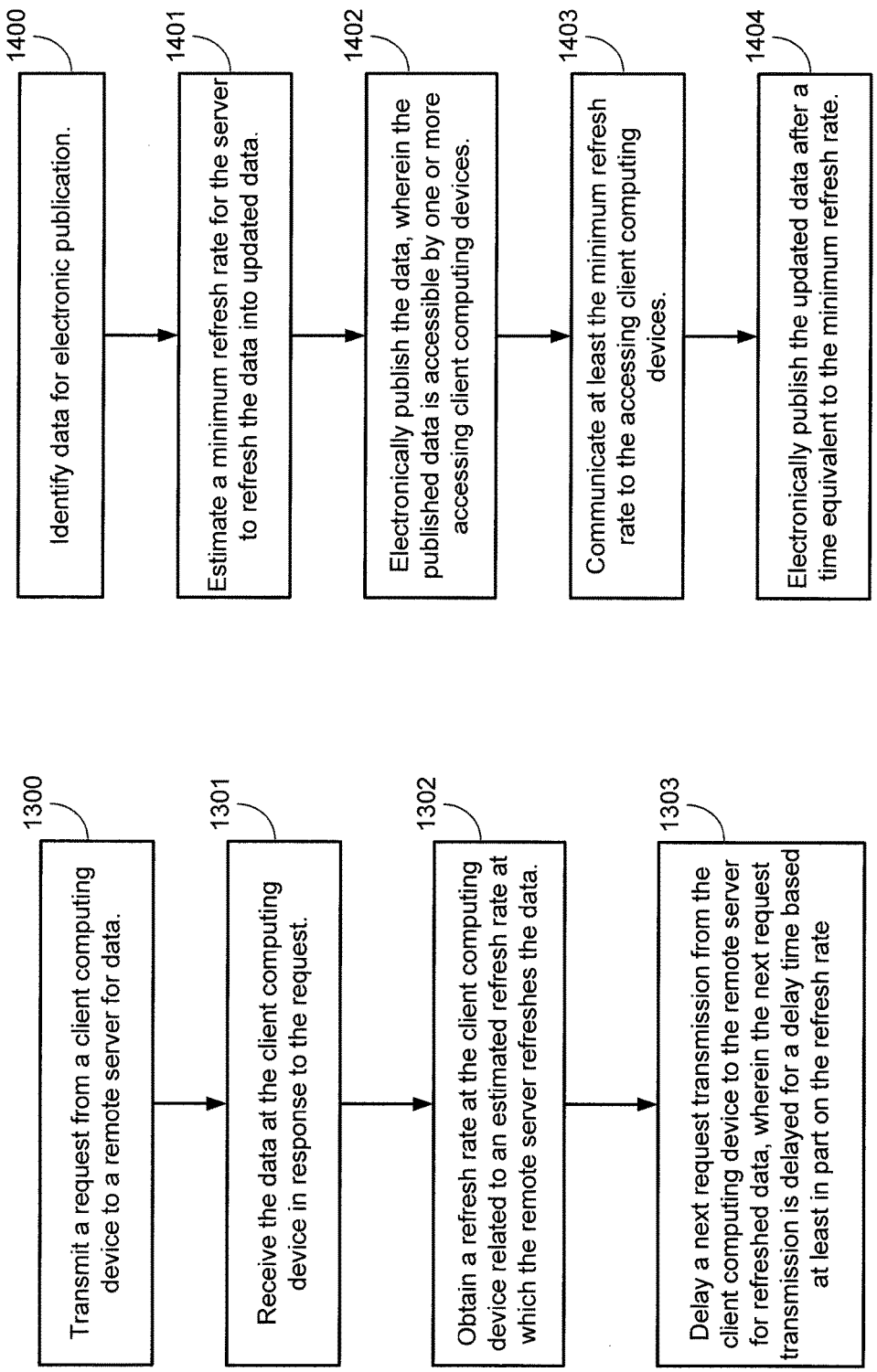

SIGNALING OF REFRESH RATE FOR EFFICIENT DATA UPDATE IN DISTRIBUTED COMPUTING ENVIRONMENTS

CROSS-REFERENCE TO RELATED APPLICATIONS

This application claims the benefit of U.S. Provisional Patent Application No. 61/703,188, entitled, "SIGNALING OF REFRESH RATE FOR EFFICIENT DATA UPDATE IN DISTRIBUTED COMPUTING ENVIRONMENTS", filed on Sep. 19, 2012, which is expressly incorporated by reference herein in its entirety.

BACKGROUND

Field

Aspects of the present disclosure relate generally to distributed computing systems, and more particularly, to signaling of refresh rate for efficient data update in distributed computing environments.

Background

The client-server model of distributed computing has evolved from multiple individual "dumb" hardware video terminals that merely provide simple video access points to a mainframe computer that executes the application logic to modern complex rich computing devices that execute local applications which may act as a client to a server application located within the same computing device or a server application or hardware located remotely and accessible through a traditional wireline internet protocol (IP) network, a wireless local area network (WLAN), or by accessing an IP network through a wireless wide area network (WWAN).

Internet access through the World Wide Web (WWW) is generally implemented in a client-server model. A web browser, operating locally on a computing device, communicates using hypertext transfer protocol (HTTP) through an IP network to various numbers of remote web servers that provide the application data, logic, and/or simple hypertext markup language (HTML) documents that are interpreted and displayed by the web browser. The web browser, operating locally, transmits a request using HTTP over the IP network addressed to a particular web server. The web server then responds with the requested data and any status codes that may identify additional information, problems, or the like. Other examples include standalone applications that access data, whether processed remotely or simply recorded remotely, for use in the locally executing application. News applications, stock quote applications, weather applications, games, and the like; each such application may operate locally on a computing device, whether a desktop computer or other mobile computing device, such as a laptop computer, tablet computer, mobile phone, or the like, and access remote servers for the data to be processed and displayed on the computing device.

In operating applications using the client-server model, the client device/application will typically transmit periodic update requests to receive updated or refreshed information. For example, in the web browser example, the browser will periodically send update requests to refresh the display with new information. Stock quote applications will periodically request updates of the current stock prices. With the widespread availability of broadband network access, the use of the bandwidth often does not seem of consequence to wireline internet connected computers. However, client devices that access using wireless technologies may have limited bandwidth for use or if the clients are mobile devices, power consumption and battery life are important considerations, which may become an issue with unnecessary data update request transmissions. Too many refresh requests may drain the battery more quickly in such mobile wireless devices, rendering the device useless for other types of communication or diminishing the time available for use between charging the battery.

SUMMARY

In one aspect of the disclosure, a method of distributed computing includes retrieving transport parameters by a client device from a service description file describing a data transmission service, obtaining, by the client device, a refresh rate from the service description file, wherein the refresh rate relates to a frequency at which the data transmission service updates data in a data transmission provided by the data transmission service, and wherein the service description file is separate from the data transmission service, accessing the data transmission by the client device to receive the data from the data transmission service using the transport parameters retrieved from the service description file, and delaying subsequent access to the data transmission by the client device to receive updated data, wherein the subsequent access is delayed for a delay time based at least in part on the refresh rate.

In an additional aspect of the disclosure, a method of distributed computing includes identifying, at a broadcast service, data for broadcast transmission, obtaining a minimum refresh rate corresponding to a frequency at which the broadcast service updates the data into updated data, transmitting the data by the broadcast service, wherein the transmitted data is accessible by one or more accessing client devices, communicating at least the minimum refresh rate to the one or more accessing client devices, and transmitting the updated data by the broadcast service after a time equivalent to the minimum refresh rate.

Additional aspects of the disclosure are directed to a client device configured for distributed computing that includes means for retrieving transport parameters by a client device from a service description file describing a data transmission service, wherein the service description file is separate from the data transmission service, means for obtaining, by the client device, a refresh rate from the service description file, wherein the refresh rate relates to a frequency at which the data transmission service updates data in a data transmission provided by the data transmission service, means for accessing the data transmission by the client device to receive the data from the data transmission service using the transport parameters retrieved from the service description file, and means for delaying subsequent access to the data transmission by the client device to receive updated data, wherein the subsequent access is delayed for a delay time based at least in part on the refresh rate.

Additional aspects of the disclosure are directed to an apparatus configured for distributed computing including means for identifying, at a broadcast service, data for broadcast transmission, means for obtaining a minimum refresh rate corresponding to a frequency at which the broadcast service updates the data into updated data, means for transmitting the data by the broadcast service, wherein the transmitted data is accessible by one or more accessing client devices, means for communicating at least the minimum refresh rate to the one or more accessing client devices, and means for transmitting the updated data by the broadcast service after a time equivalent to the minimum refresh rate.

Additional aspects of the disclosure are directed to a computer program product for wireless communications in a wireless network that includes a non-transitory computer-readable medium having program code recorded thereon. The program code includes code to retrieve transport parameters by a client device from a service description file describing a data transmission service, wherein the service description file is separate from the data transmission service, code to obtain, by the client device, a refresh rate from the service description file, wherein the refresh rate relates to a frequency at which the data transmission service updates data in a data transmission provided by the data transmission service, code to access the data transmission by the client device to receive the data from the data transmission service using the transport parameters retrieved from the service description file, and code to delay subsequent access to the data transmission by the client device to receive updated data, wherein the subsequent access is delayed for a delay time based at least in part on the refresh rate.

Additional aspects of the disclosure are directed to a computer program product for wireless communications in a wireless network that includes a non-transitory computer-readable medium having program code recorded thereon. The program code includes code to identify, at a broadcast service, data for broadcast transmission, code to obtain a minimum refresh rate corresponding to a frequency at which the broadcast service updates the data into updated data, code to transmit the data by the broadcast service, wherein the transmitted data is accessible by one or more accessing client devices, code to communicate at least the minimum refresh rate to the one or more accessing client devices, and code to transmit the updated data by the broadcast service after a time equivalent to the minimum refresh rate.

Additional aspects of the disclosure are directed to a client device configured for wireless communication. The apparatus includes at least one processor and a memory coupled to the at least one processor. The processor is configured to retrieve transport parameters by the client device from a service description file describing a data transmission service, wherein the service description file is separate from the data transmission service, to obtain, by the client device, a refresh rate from the service description file, wherein the refresh rate relates to a frequency at which the data transmission service updates data in a data transmission provided by the data transmission service, to access the data transmission by the client device to receive the data from the data transmission service using the transport parameters retrieved from the service description file, and to delay subsequent access to the data transmission by the client device to receive updated data, wherein the subsequent access is delayed for a delay time based at least in part on the refresh rate.

Additional aspects of the disclosure are directed to an apparatus configured for wireless communication. The apparatus includes at least one processor and a memory coupled to the at least one processor. The processor is configured to identify, at a broadcast service, data for broadcast transmission, to obtain a minimum refresh rate corresponding to a frequency at which the broadcast service updates the data into updated data, to transmit the data by the broadcast service, wherein the transmitted data is accessible by one or more accessing client devices, to communicate at least the minimum refresh rate to the one or more accessing client devices, and to transmit the updated data by the broadcast service after a time equivalent to the minimum refresh rate.

BRIEF DESCRIPTION OF THE DRAWINGS

FIG. 13 is a functional block diagram illustrating example blocks executed to implement one aspect of the present disclosure.

FIG. 14 is a functional block diagram illustrating example blocks executed to implement one aspect of the present disclosure.

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Figure 1:
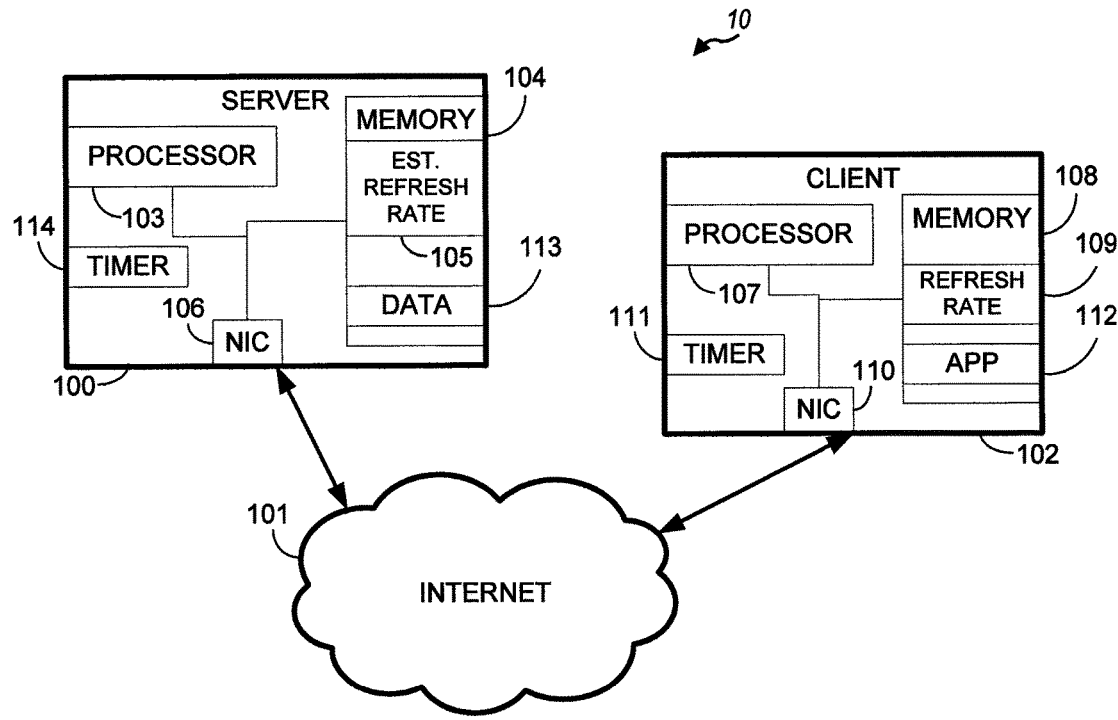
FIG. 1 is a block diagram illustrating a client-server architecture configured according to one aspect of the present disclosure.

FIG. 1 is a block diagram illustrating client-server architecture 10 configured according to one aspect of the present disclosure. Client-server architecture 10, at its simplest representation provides a server 100 in communication with a client device 102 over an IP network, such as Internet 101. Client device 102 may comprise any number of different devices including a desktop computer, laptop computer, tablet computer, mobile phone, user equipment (UE), access terminal (AT), or the like, which connects to Internet 101 over a traditional wireline communication protocol or a wireless communication protocol, whether using a WLAN or WWAN. Client device 102 includes at least a processor 107, which may include multiple processors or multiple processing cores, coupled to memory 108 and a network interface card (NIC) 110. Memory 108 stores various information, applications, and data, such as refresh rate 109 and APP 112. NIC 110 provides the communication interface between client device 102 and Internet 101. NIC 110 may, therefore, provide wireline coupling, wireless coupling to WLAN or WWAN networks, or the like.

Server 100 also includes at least a processor 107, which may include multiple processors or multiple processing cores, coupled to memory 104 and a NIC 106. Similarly to memory 108 of client device 102, memory 104 of server 100 stores various information, applications, and data, such as estimated refresh rate 105 and data 113. NIC 106 similarly provides the communication interface between server 100 and Internet 101.

Operations of client-server architecture 10 typically include client device 102 executing an application, such as APP 112, which uses data that is maintained remotely by server 100. As the application on client device 102 requires the remote data, a request is sent over Internet 101 to server 100 for the remote data. Server 100 generally responds by sending data 113 over Internet 101 to client device 102. The executing application will then use data 113 in its operating environment. Such applications may take many forms including a web browser, in which data 113 comprises the HTML data for presentation on the web browser. It may also be a stock quote or news application, in which case data 113 would comprise the stock quotes or news stories for presentation by the applications. There is essentially no limit to the variety of application that operates as a client for data that is processed and maintained remotely by server 100.

According to various aspects of the present disclosure, as server 100 identifies data 113 for electronically publishing or making such data available or accessible to one or more client devices, it estimates or is configured with a refresh rate. The refresh rate is the periodic time frame at which server 100 will update or refresh data 113. For example, when data 113 represents stock quotes or news stories, server 100 estimates how often it will update data 113 with the new stock quotes or new news stories. As server 100 provides access to data 113, client device 102 will receive data 113 in response to requests for such data. However, server 100 will also communicate and client device 102 will also obtain a refresh rate that is based on the estimated refresh rate. Instead of relying on pre-determined update request schedules, client device 102 will use the refresh rate to determine when to next send a request for updated data. In so doing, the rate at which client device 102 will send update requests will correspond to the rate at which server 100 will update data 113. This additional refresh rate information will allow client device 102 to more efficiently request and receive updated data.

Figure 2:
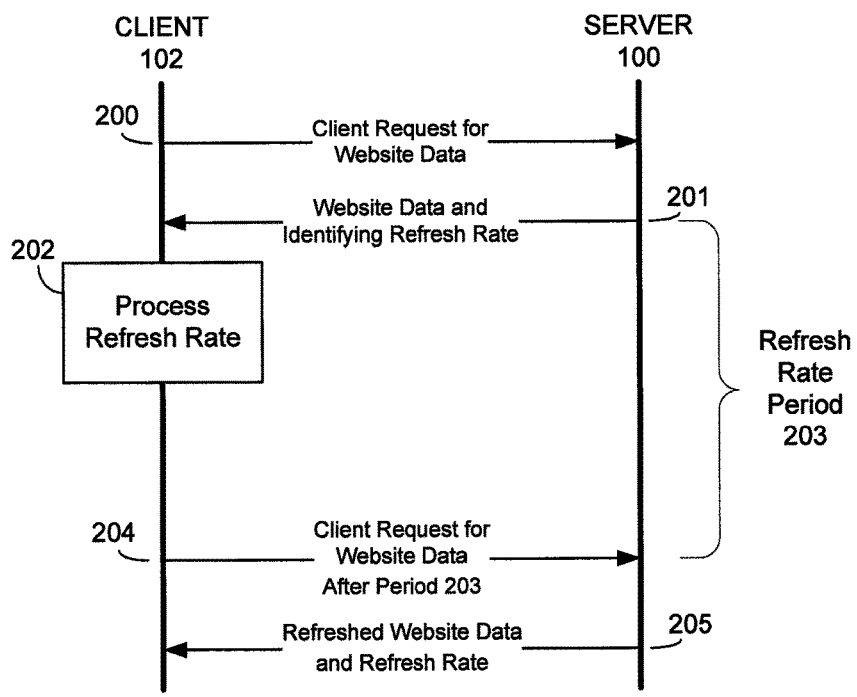
FIG. 2 is a communication flow diagram between a client device and a server according to one aspect of the present disclosure.

FIG. 2 is a communication flow diagram between client device 102 and server 100 according to one aspect of the present disclosure. For purposes of the example illustrated in FIG. 2, the client-server architecture supports web access in which client device 102 operates a client web browser seeking to display a particular website hosted at server 100. At time 200, client device 102 sends a client request using HTTP for website data to server 100. Server 100 sends the website data along with a refresh rate of the website. In the presently described aspect of FIG. 2, server 100 assigns the refresh rate to the client device 102. Client device 102 processes the refresh rate at time 202. The processing causes client 102 to delay the next request for updated website data for a refresh rate period 203. The refresh rate period 203 may be based on the refresh rate received from server 100.

After refresh rate period 203, client 102 transmits the next client request for updated website data at time 204. In response, server 100 transmits the refreshed website data at time 205. According to the described aspect, when server 100 transmits the refreshed website data, it also includes the refresh rate. Depending on the content of the website, the refresh rate transmitted at time 205 may be the same rate or a different rate. Server 100 may, thus, dynamically change the refresh rate to reflect the changing conditions of the website. During some periods, the website may not change very much resulting in a longer refresh rate, while at other periods, the website may change rapidly resulting in a shorter refresh rate.

It should be noted that various means may be used to deliver the refresh rate over HTTP in selected aspects of the present disclosure. For example, extension headers may be used to return refresh rate data. Additionally, HTTP standards may be modified to add new status codes that may be used to communicate refresh rate data. The various aspects of the present disclosure are not limited to any single method for delivering refresh rate data from the server to the client.

Various aspects of the present disclosure may also be used in less typical client-server architecture models, such as in broadcast data delivery through broadcast networks. Such data delivery through broadcast networks is often referred to as datacasting. Broadcast networks may offer several types of services. For example streaming services may be provided in which media is transported by various means, such as through real-time transport protocol (RTP), Moving Picture Experts Group (MPEG) transport stream (TS), and the like. The received media in such streaming services is typically "consumed" or processed immediately. File delivery services are also provided by broadcast networks. File delivery services deliver various data or content using reliable transport protocols, such as file delivery over uni-directional transport (FLUTE), non-acknowledgement (NAK)-oriented reliable multicast (NORM), or the like. The delivered content may be consumed immediately or stored to process at a later time.

New broadcasting technologies for broadcast networks using WWAN, such as LTE networks, may begin to blur the line between the separate streaming and file delivery services of traditional broadcast networks. Dynamic Adaptive Streaming over HTTP (DASH) is a streaming transport standard that provides for content files of different sizes and qualities that will be dynamically available for download depending on signal strength and network load. The stream will be able to dynamically and seamlessly switch between the different sizes and qualities as these transport factors (e.g., signal strength, network load, and the like) change. DASH via a unicast system may replay RTP in IP networks, while its use in broadcast systems may create a file-based streaming service, or a sub-type of file delivery services in which the delivered media is consumed immediately.

The various aspects and techniques described herein may be used in conjunction with various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE, and LTE terminology is used in much of the description below.

Figure 3:
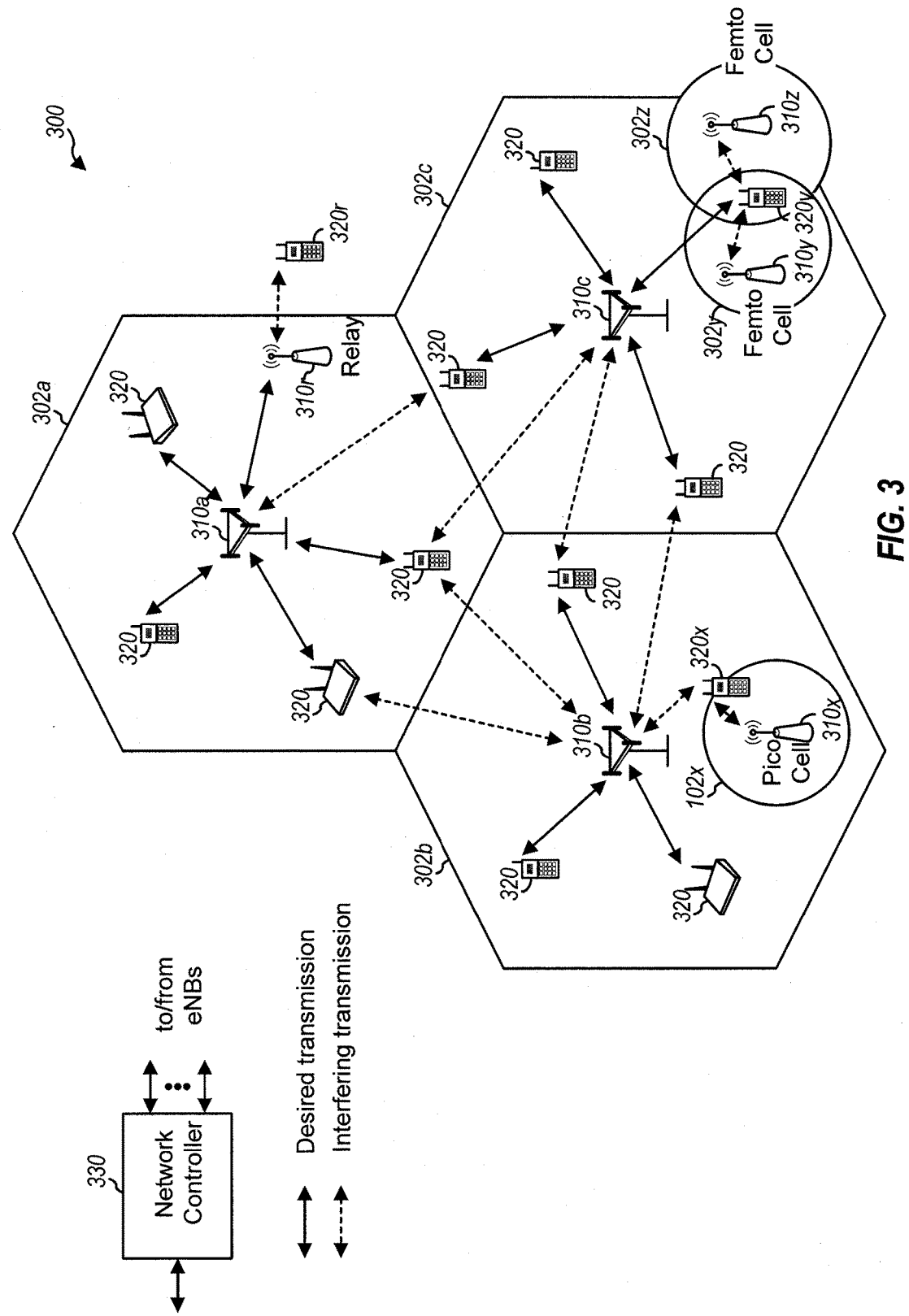
FIG. 3 is a block diagram illustrating an example of a telecommunications system.

FIG. 3 shows a wireless communication network 300, which may be an LTE network. The wireless network 300 may include a number of eNBs 310 and other network entities. An eNB may be a station that communicates with the UEs and may also be referred to as a base station, a Node B, an access point, or other term. Each eNB 310a, 310b, 310c may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB (HNB). In the example shown in FIG. 3, the eNBs 310a, 310b and 310c may be macro eNBs for the macro cells 302a, 302b and 302c, respectively. The eNB 310x may be a pico eNB for a pico cell 302x, serving a UE 320x. The eNBs 310y and 310z may be femto eNBs for the femto cells 302y and 302z, respectively. An eNB may support one or multiple (e.g., three) cells.

The wireless network 300 may also include relay stations 310r. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 3, a relay station 310r may communicate with the eNB 310a and a UE 320r in order to facilitate communication between the eNB 310a and the UE 320r. A relay station may also be referred to as a relay eNB, a relay, etc.

The wireless network 300 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 300. For example, macro eNBs may have a high transmit power level (e.g., 20 Watts) whereas pico eNBs, femto eNBs and relays may have a lower transmit power level (e.g., 1 Watt).

The wireless network 300 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 330 may couple to a set of eNBs and provide coordination and control for these eNBs. The network controller 330 may communicate with the eNBs 310 via a backhaul. The eNBs 310 may also communicate with one another, e.g., directly or indirectly via wireless or wireline backhaul.

The UEs 320 may be dispersed throughout the wireless network 300, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, or other mobile entities. A UE may be able to communicate with macro eNBs, pico eNBs, femto eNBs, relays, or other network entities. In FIG. 3, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.4, 3, 5, 10, 15, or 20 megahertz (MHz), respectively. The system bandwidth may also be partitioned into subbands. For example, a subband may cover 1.08 MHz, and there may be 1, 2, 4, 8 or 16 subbands for system bandwidth of 1.4, 3, 5, 10, 15, or 20 MHz, respectively.

Figure 4:
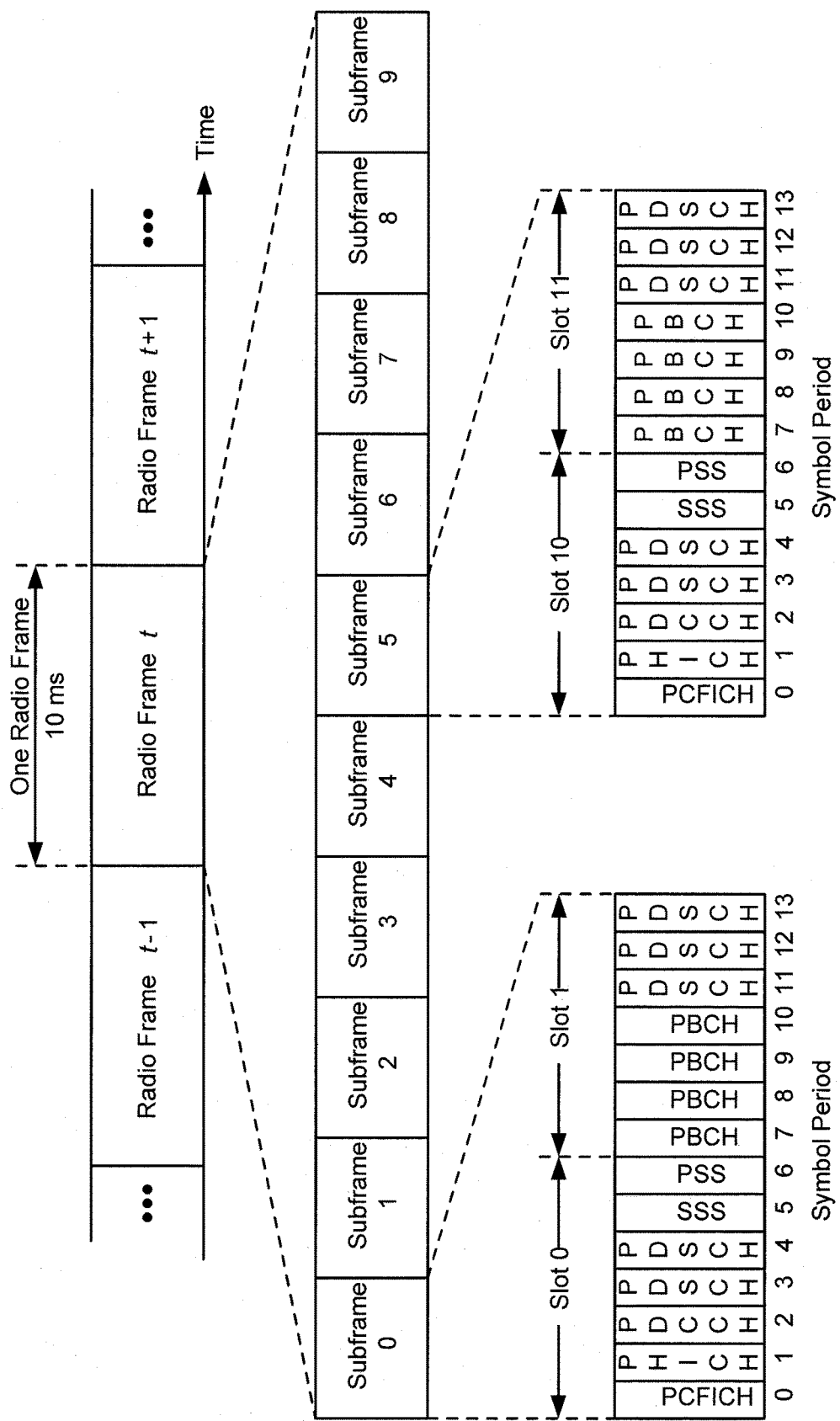
FIG. 4 is a block diagram conceptually illustrating an example of a down link frame structure in a telecommunications system.
Figure 6:
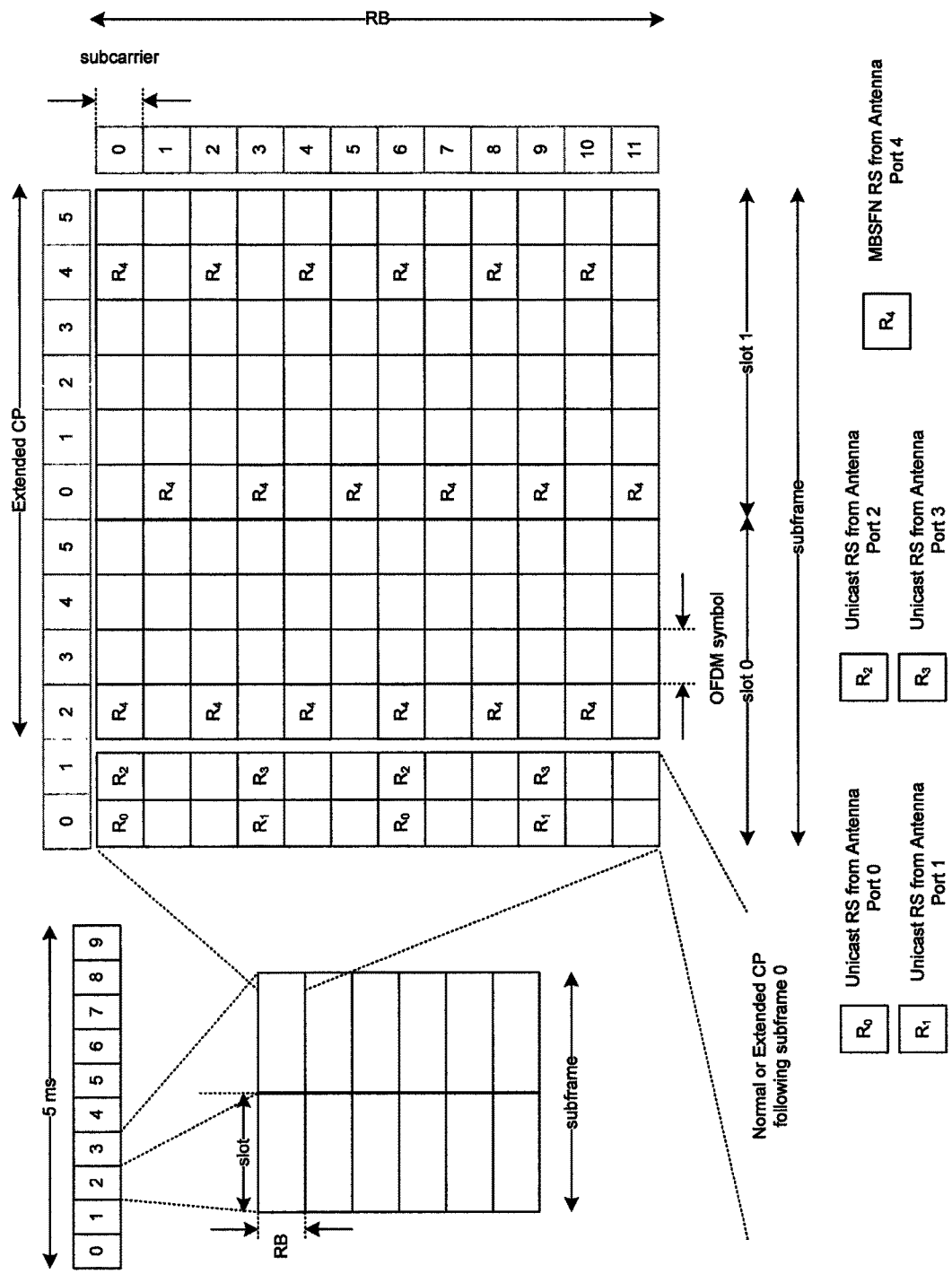
FIG. 6 is a diagram of a signaling frame illustrating an example of symbol allocation for unicast and multicast signals.

FIG. 4 shows a down link frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (CP), as shown in FIG. 4, or 6 symbol periods for an extended cyclic prefix. The normal CP and extended CP may be referred to herein as different CP types. The 2 L symbol periods in each subframe may be assigned indices of 0 through 2 L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 4. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in only a portion of the first symbol period of each subframe, although depicted in the entire first symbol period in FIG. 4. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 4, M=3. The eNB may send a Physical HARQ Indicator Channel (PHICH) and a Physical Downlink Control Channel (PDCCH) in the first M symbol periods of each subframe (M=3 in FIG. 4). The PHICH may carry information to support hybrid automatic retransmission (HARQ). The PDCCH may carry information on resource allocation for UEs and control information for downlink channels. Although not shown in the first symbol period in FIG. 4, it is understood that the PDCCH and PHICH are also included in the first symbol period. Similarly, the PHICH and PDCCH are also both in the second and third symbol periods, although not shown that way in FIG. 4. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Figure 5:
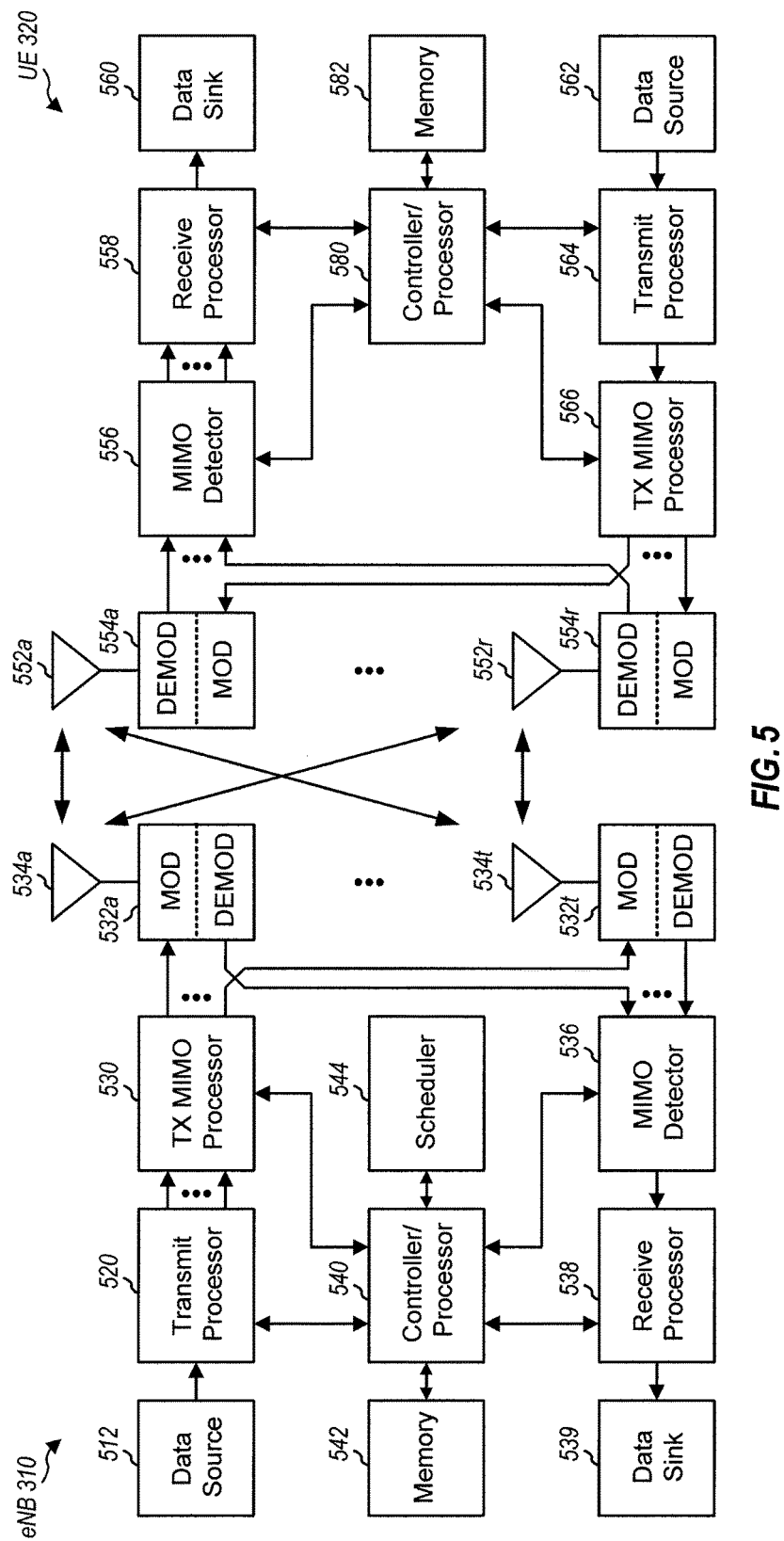
FIG. 5 is a block diagram illustrating a design of a base station/eNB and a UE configured according to one aspect of the present disclosure.

FIG. 5 shows a block diagram of a design of a base station/eNB 310 and a UE 320, which may be one of the base stations/eNBs and one of the UEs in FIG. 3. For a restricted association scenario, the base station 310 may be the macro eNB 310c in FIG. 3, and the UE 320 may be the UE 320y. The base station 310 may also be a base station of some other type. The base station 310 may be equipped with antennas 534a through 534t, and the UE 320 may be equipped with antennas 552a through 552r.

At the base station 310, a transmit processor 520 may receive data from a data source 512 and control information from a controller/processor 540. The control information may be for the PBCH, PCFICH, PHICH, PDCCH, etc. The data may be for the PDSCH, etc. The processor 520 may process (e.g., encode and symbol map) the data and control information to obtain data symbols and control symbols, respectively. The processor 520 may also generate reference symbols, e.g., for the PSS, SSS, and cell-specific reference signal. A transmit (TX) multiple-input multiple-output (MIMO) processor 530 may perform spatial processing (e.g., precoding) on the data symbols, the control symbols, and/or the reference symbols, if applicable, and may provide output symbol streams to the modulators (MODs) 532a through 532t. Each modulator 532 may process a respective output symbol stream (e.g., for OFDM, etc.) to obtain an output sample stream. Each modulator 532 may further process (e.g., convert to analog, amplify, filter, and upconvert) the output sample stream to obtain a downlink signal. Downlink signals from modulators 532a through 532t may be transmitted via the antennas 534a through 534t, respectively.

At the UE 320, the antennas 552a through 552r may receive the downlink signals from the base station 310 and may provide received signals to the demodulators (DE-MODs) 554a through 554r, respectively. Each demodulator 554 may condition (e.g., filter, amplify, downconvert, and digitize) a respective received signal to obtain input samples. Each demodulator 554 may further process the input samples (e.g., for OFDM, etc.) to obtain received symbols. A MIMO detector 556 may obtain received symbols from all the demodulators 554a through 554r, perform MIMO detection on the received symbols if applicable, and provide detected symbols. A receive processor 558 may process (e.g., demodulate, deinterleave, and decode) the detected symbols, provide decoded data for the UE 320 to a data sink 560, and provide decoded control information to a controller/processor 580.

On the uplink, at the UE 320, a transmit processor 564 may receive and process data (e.g., for the PUSCH) from a data source 562 and control information (e.g., for the PUCCH) from the controller/processor 580. The processor 564 may also generate reference symbols for a reference signal. The symbols from the transmit processor 564 may be precoded by a TX MIMO processor 566 if applicable, further processed by the modulators 554a through 554r (e.g., for SC-FDM, etc.), and transmitted to the base station 310. At the base station 310, the uplink signals from the UE 320 may be received by the antennas 534, processed by the demodulators 532, detected by a MIMO detector 536 if applicable, and further processed by a receive processor 538 to obtain decoded data and control information sent by the UE 320. The processor 538 may provide the decoded data to a data sink 539 and the decoded control information to the controller/processor 540.

The controllers/processors 540 and 580 may direct the operation at the base station 310 and the UE 320, respectively. The processor 540 and/or other processors and modules at the base station 310 may perform or direct the execution of various processes for the techniques described herein. The processor 580 and/or other processors and modules at the UE 320 may also perform or direct the execution of the functional blocks illustrated in FIGS. 11-14, and/or other processes for the techniques described herein. The memories 542 and 582 may store data and program codes for the base station 310 and the UE 320, respectively. A scheduler 544 may schedule UEs for data transmission on the downlink and/or uplink.

In one configuration, the UE 320 for wireless communication includes means for detecting interference from an interfering base station during a connection mode of the UE, means for selecting a yielded resource of the interfering base station, means for obtaining an error rate of a physical downlink control channel on the yielded resource, and means, executable in response to the error rate exceeding a predetermined level, for declaring a radio link failure. In one aspect, the aforementioned means may be the processor(s), the controller/processor 580, the memory 582, the receive processor 558, the MIMO detector 556, the demodulators 554a, and the antennas 552a configured to perform the functions recited by the aforementioned means. In another aspect, the aforementioned means may be a module or any apparatus configured to perform the functions recited by the aforementioned means.

eMBMS and Unicast Signaling in Single Frequency Networks:

One technique to facilitate high bandwidth communication for multimedia has been single frequency network (SFN) operation. Particularly, Multimedia Broadcast Multicast Service (MBMS) and MBMS for LTE, also known as evolved MBMS (eMBMS) (including, for example, what has recently come to be known as multimedia broadcast single frequency network (MBSFN) in the LTE context), can utilize such SFN operation. SFNs utilize radio transmitters, such as, for example, eNBs, to communicate with subscriber UEs. Groups of eNBs can transmit information in a synchronized manner, so that signals reinforce one another rather than interfere with each other. In the context of eMBMS, the shared content is transmitted from multiple eNB's of a LTE network to multiple UEs. Therefore, within a given eMBMS area, a UE may receive eMBMS signals from any eNB(s) within radio range as part of the eMBMS service area or MBSFN area. However, to decode the eMBMS signal each UE receives Multicast Control Channel (MCCH) information from a serving eNB over a non-eMBMS channel. MCCH information changes from time to time and notification of changes is provided through another non-eMBMS channel, the PDCCH. Therefore, to decode eMBMS signals within a particular eMBMS area, each UE is served MCCH and PDCCH signals by one of the eNBs in the area.

In accordance with aspects of the subject of this disclosure, there is provided a wireless network (e.g., a 3GPP network) having features relating to single carrier optimization for eMBMS. eMBMS provides an efficient way to transmit shared content from an LTE network to multiple mobile entities, such as, for example, UEs.

With respect a physical layer (PHY) of eMBMS for LTE Frequency Division Duplex (FDD), the channel structure may comprise time division multiplexing (TDM) resource partitioning between eMBMS and unicast transmissions on mixed carriers, thereby allowing flexible and dynamic spectrum utilization. Currently, a subset of subframes (up to 60%), known as multimedia broadcast single frequency network (MBSFN) subframes, can be reserved for eMBMS transmission. As such current eMBMS design allows at most six out of ten subframes for eMBMS.

An example of subframe allocation for eMBMS is shown in FIG. 6, which shows an existing allocation of MBSFN reference signals on MBSFN subframes, for a single-carrier case. Components depicted in FIG. 6 correspond to those shown in FIG. 4, with FIG. 6 showing the individual subcarriers within each slot and resource block (RB). In 3GPP LTE, an RB spans 12 subcarriers over a slot duration of 0.5 ms, with each subcarrier having a bandwidth of 15 kHz together spanning 180 kHz per RB. Subframes may be allocated for unicast or eMBMS; for example in a sequence of subframes labeled 0, 1, 2, 3, 4, 5, 6, 7, 8, and 9, subframes 0, 4, 5, and 9 may be excluded from eMBMS in FDD. Also, subframes 0, 1, 5, and 6 may be excluded from eMBMS in time division duplex (TDD). More specifically, subframes 0, 4, 5, and 9 may be used for PSS/SSS/PBCH/paging/system information blocks (SIBs) and unicast service. Remaining subframes in the sequence, e.g., subframes 1, 2, 3, 6, 7, and 8 may be configured as eMBMS subframes.

Figure 7:
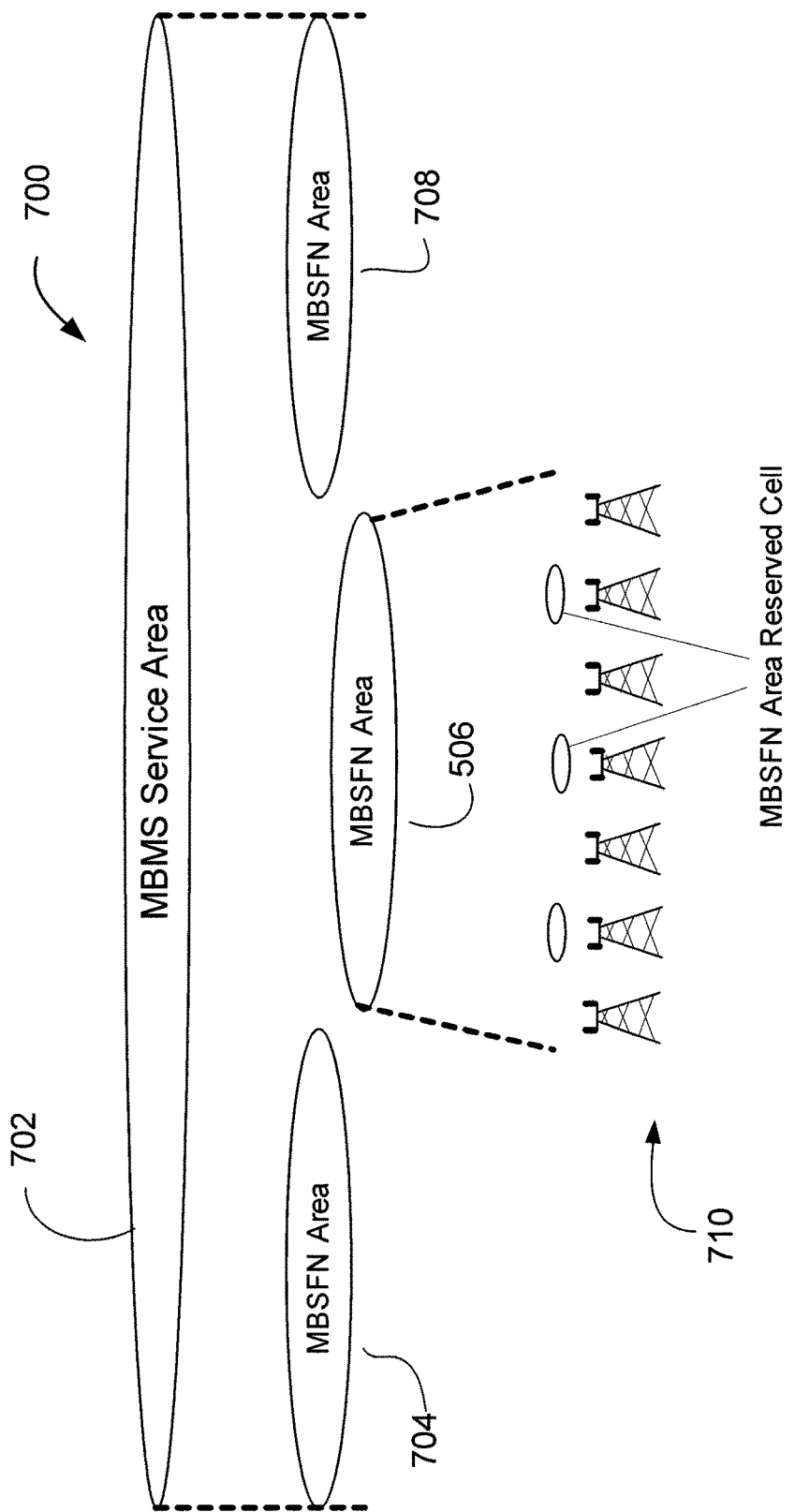
FIG. 7 is a diagram illustrating MBMS over a Single Frequency Network (MBSFN) areas within an MB SFN service area.
Figure 8:
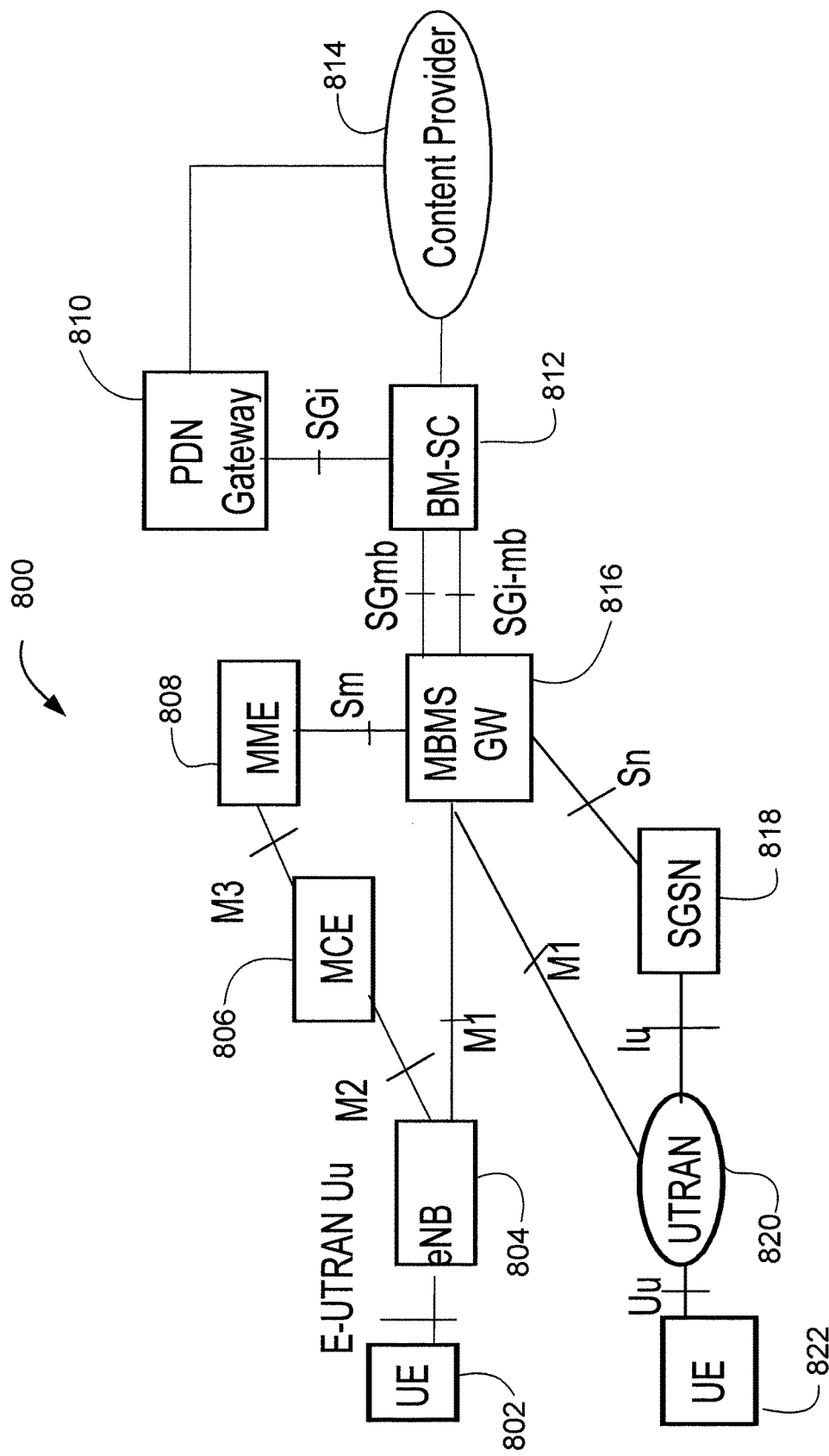
FIG. 8 is a block diagram illustrating components of a wireless communication system for providing or supporting MBSFN service.

With continued reference to FIG. 6, within each eMBMS subframe, the first 1 or 2 symbols may be used for unicast reference symbols (RSs) and control signaling. A CP length of the first 1 or 2 symbols may follow that of subframe 0. A transmission gap may occur between the first 1 or 2 symbols and the eMBMS symbols if the CP lengths are different. In related aspects, the overall eMBMS bandwidth utilization may be 42.5% considering RS overhead (e.g., 6 eMBMS subframes and 2 control symbols within each eMBMS subframe). Known techniques for providing MBSFN RSs and unicast RSs typically involve allocating the MBSFN RSs on MBSFN subframes (as shown in FIG. 6), and separately allocating unicast RSs on non-MBSFN subframes. More specifically, as FIG. 6 shows, the extended CP of the MBSFN subframe includes MBSFN RSs but not unicast RSs. The present technology is not limited to the particular frame allocation scheme illustrated by FIGS. 4 and 6, which are presented by way of example, and not by way of limitation. A multicast session or multicast broadcast as used herein may use any suitable frame allocation scheme.

eMBMS Service Areas:

FIG. 7 illustrates a system 700 including an MBMS service area 702 encompassing multiple MBSFN areas 704, 706, 708, which themselves include multiple cells or base stations 710. As used herein, an "MBMS service area" refers to a group of wireless transmission cells where a certain MBMS service is available. For example, a particular sports or other program may be broadcast by base stations within the MBMS service area at a particular time. The area where the particular program is broadcast defines the MBMS service area. The MBMS service area may be made up of one or more "MBSFN areas" as shown at 704, 706 and 708. As used herein, an MBSFN area refers to a group of cells (e.g., cells 710) currently broadcasting a particular program in a synchronized fashion using an MBSFN protocol. An "MBSFN synchronization area" refers to a group of cells that are interconnected and configured in a way such that they are capable of operating in a synchronized fashion to broadcast a particular program using an MBSFN protocol, regardless of whether or not they are currently doing so. Each eNB can belong to only one MBSFN synchronization area, on a given frequency layer. It is worth noting that an MBMS service area 702 may include one or more MBSFN synchronization areas (not shown). Conversely, an MBSFN synchronization area may include one or more MBSFN areas or MBMS service areas. Generally, an MBSFN area is made up of all, or a portion of, a single MBSFN synchronization area and is located within a single MBMS service area. Overlap between various MBSFN areas is supported, and a single eNB may belong to several different MBSFN areas. For example, up to 8 independent MCCHs may be configured in System Information Block (SIB) 13 to support membership in different MBSFN areas. An MBSFN Area Reserved Cell or Base Station is a cell/base station within a MBSFN Area that does not contribute to the MBSFN transmission, for example a cell near a MBSFN Synchronization Area boundary, or a cell that that is not needed for MBSFN transmission because of its location.

eMBMS System Components and Functions:

FIG. 8 illustrates functional entities of a wireless communication system 800 for providing or supporting MBSFN service. Regarding Quality of Service (QoS), the system 800 uses a Guaranteed Bit Rate (GBR) type MBMS bearer, wherein the Maximum Bit Rate (MBR) equals the GBR. These components are shown and described by way of example, and do not limit the inventive concepts described herein, which may be adopted to other architectures and functional distributions for delivering and controlling multicast transmissions.

The system 800 may include an MBMS Gate Way (MBMS GW) 816. The MBMS GW 816 controls Internet Protocol (IP) multicast distribution of MBMS user plane data to eNBs via an M1 interface; the illustrated eNB 804 may be one of many possible. In addition, the MBMS GW controls IP multicast distribution of MBMS user plane data to UTRAN Radio Network Controllers (RNCs) 820 via an M1 interface; the illustrated UTRAN RNC 820 may be one of many possible RNCs. The M1 interface is associated to MBMS data (user plane) and makes use of IP for delivery of data packets. The eNB 804 may provide MBMS content to UE 802 via an E-UTRAN Uu interface. The UTRAN RNC 820 may provide MBMS content to UE 822 via a Uu interface. The MBMS GW 816 may further perform MBMS Session Control Signaling, for example MBMS session start and session stop, via the Mobility Management Entity (MME) 808 and Sm interface. The MBMS GW 816 may further provide an interface for entities using MBMS bearers through the SG-mb (user plane) reference point, and provide an interface for entities using MBMS bearers through the SGi-mb (control plane) reference point. The SG-mb Interface carries MBMS bearer service specific signaling. The SGi-mb interface is a user plane interface for MBMS data delivery. MBMS data delivery may be performed by IP unicast transmission, which may be a default mode, or by IP multicasting. The MBMS GW 816 may provide a control plane function for MBMS over UTRAN via a Serving General Packet Radio Service Support Node (SGSN) 818 and the Sn/Iu interfaces.

The system 800 may further include a Multicast Coordinating Entity (MCE) 806. MCE 806 may perform an admission control function from MBMS content, and allocate time and frequency radio resources used by all eNBs in the MBSFN area for multi-cell MBMS transmissions using MBSFN operation. MCE 806 may determine a radio configuration for an MBSFN Area, such as, for example, the modulation and coding scheme. MCE 806 may schedules and control user plane transmission of MBMS content, and manage eMBMS service multiplexing, by determining which services are to be multiplexed in which Multicast Channel (MCH). The MCE 806 may participate in MBMS Session Control Signaling with the MME 808 through an M3 interface, and may provide a control plane interface M2 with the eNB 804.

The system 800 may further include a Broadcast-Multicast Service Center (BM-SC) 812 in communication with a content provider server 814. The BM-SC 812 may handle intake of multicast content from one or more sources such as the content provider 814, and provide other higher-level management functions as described below. These functions may include, for example, a membership function, including authorization and initiation of MBMS services for an identified UE. The BM-SC 812 may further perform MBMS session and transmission functions, scheduling of live broadcasts, and delivery, including MBMS and associated delivery functions. The BM-SC 812 may further provide service advertisement and description, such as advertising content available for multicast. A separate Packet Data Protocol (PDP) context may be used to carry control messages between UE and BM-SC 812. The BM-SC 812 may further provide security functions such as key management, manage charging of content providers according to parameters such as data volume and QoS, provide content synchronization for MBMS in UTRAN and in E-UTRAN for broadcast mode, and provide header compression for MBSFN data in UTRAN. The BM-SC 812 may indicate session start, update and stop to the MBMS-GW 816 including session attributes such as QoS and MBMS service area.

The system 800 may further include a Multicast Management Entity (MME) 808 in communication with the MCE 806 and MBMS-GW 808. The MME 800 may provide a control plane function for MBMS over E-UTRAN. In addition, the MME may provide the eNB 804, 820 with multicast related information defined by the MBMS-GW 816. An Sm interface between the MME 808 and the MBMS-GW 816 may be used to carry MBMS control signaling, for example, session start and stop signals.

The system 800 may further include a Packet Data Network (PDN) Gate Way (GW) 810, sometimes abbreviated as a P-GW. The P-GW 810 may provide an Evolved Packet System (EPS) bearer between the UE 802 and BM-SC 812 for signaling and/or user data. As such, the P-GW may receive Uniform Resource Locator (URL) based requests originating from UEs in association with IP addresses assigned to the UEs. The BM-SC 812 may also be linked to one or more content providers via the P-GW 810, which may communicate with the BM-SC 812 via an IP interface.

In datacasting services, files are often small and may change at some predictable periodicity. When broadcasting these files, the set of files making up the broadcast/datacast group may be repeated in a periodic or circular (e.g., carousel) fashion to ensure that new devices that access the datacasting will capture the current set of files. In mobile devices, in order to improve power consumption and conserve battery life, the device will only check for updates to the set of files periodically. The specific period may be set by the device dependent on different variables, including the type of device that it is. For example, a mobile phone running a stock quote application make check of updates less often than a mobile stock kiosk at a financial institution.

Figure 9:
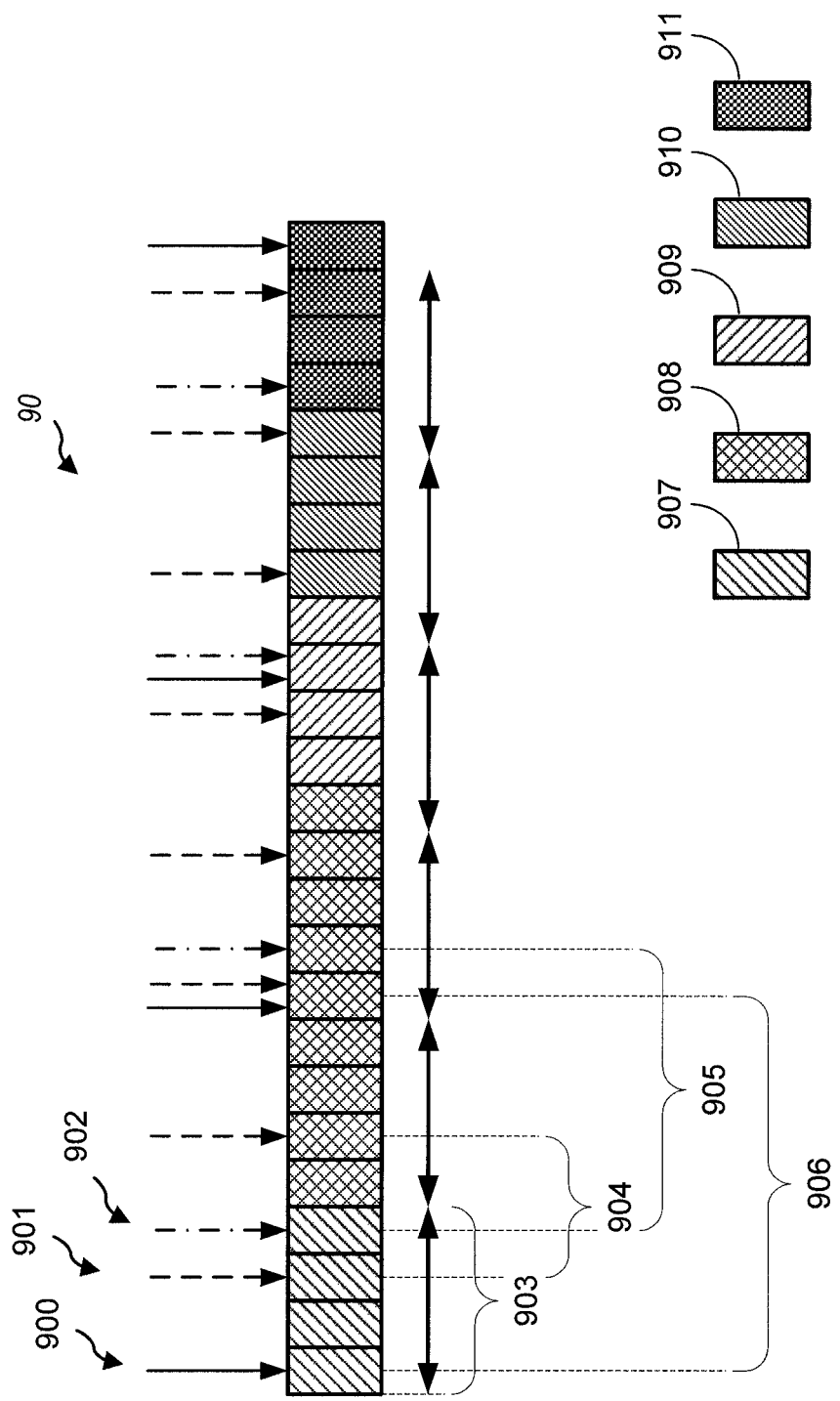
FIG. 9 is a diagram illustrating a datacasting type transmitted by a broadcasting network configured according to one aspect of the present disclosure.

FIG. 9 is a diagram illustrating a datacasting type 90 transmitted by a broadcasting network, such as that described with respect to FIG. 8. Datacasting type 90 includes a progression of a set of files that are updated periodically. For example, with reference to FIG. 8, content provider 814 provides broadcast content for the broadcast service to BM-SC 812 through P-GW 810. The first set of files provided, files 907, are thus broadcast by BM-SC 812 through the broadcasting system of MBMS-GW 816 to eNB 804 and UTRAN RNC 820. The UEs desiring to access the set of files will use the access information obtained for the broadcast service to access and receive those files. As content provider 814 compiles new information to update the files, the updates are transmitted to BM-SC 812 through P-GW 810. BM-SC 812, then updates the files and begins broadcasting the new, updated files. The first update of the set of files is reflected by files 907. The first four blocks of datacasting type 90 include files 907. Files 907 are updated to files 908, which are datacast in the following nine blocks of datacasting type 90. After updating to files 908, the files are repeated until the next update. If no update occurs, the files will repeat over a longer period. The remaining updates of files 909-911 occur after every four blocks. The broadcasting network servers may, thus, estimate or be configured for a minimum refresh rate 903 for updating the datacasting type 90 is four blocks; which may be expressed in time by computing how long it takes to transmit the four blocks at the data rate allocated for the transport of the data casting services.

It should be noted that the broadcasting service may be implemented to provide access to any UE or device within the coverage area of the broadcasting base stations (e.g., eNB 804 and base stations controlled by UTRAN RNC 820), or it may be implemented as a subscription service or multicast service. In the multicast aspect, each UE will establish the subscription prior to accessing the multicast data and the BM-SC 812 will validate the subscription prior to allowing the UE access to the multicast data. The various aspects of the present disclosure are not limited to the type of broadcast method and may be application to various types of broadcast, multicast, or unicast services.

In advertising a service of datacasting type 90, the broadcasting network may compile a broadcast service description file that includes various information concerning the available services of datacasting type 90 and other types, including information on the service name, access information or delivery methods, the media presentation description (MPD) in the case of DASH services, the frequency, location, and transport parameters of where the content for the services are broadcast, and the like. This broadcast service description file may be broadcast on a separate broadcast channel or stored at a different location than the data being broadcast in datacasting type 90. When such service description files are broadcast, they may be considered as another datacasting service, which broadcasts the file repeatedly in a circular fashion on the service announcement channel, service, or transport.

Figure 10:
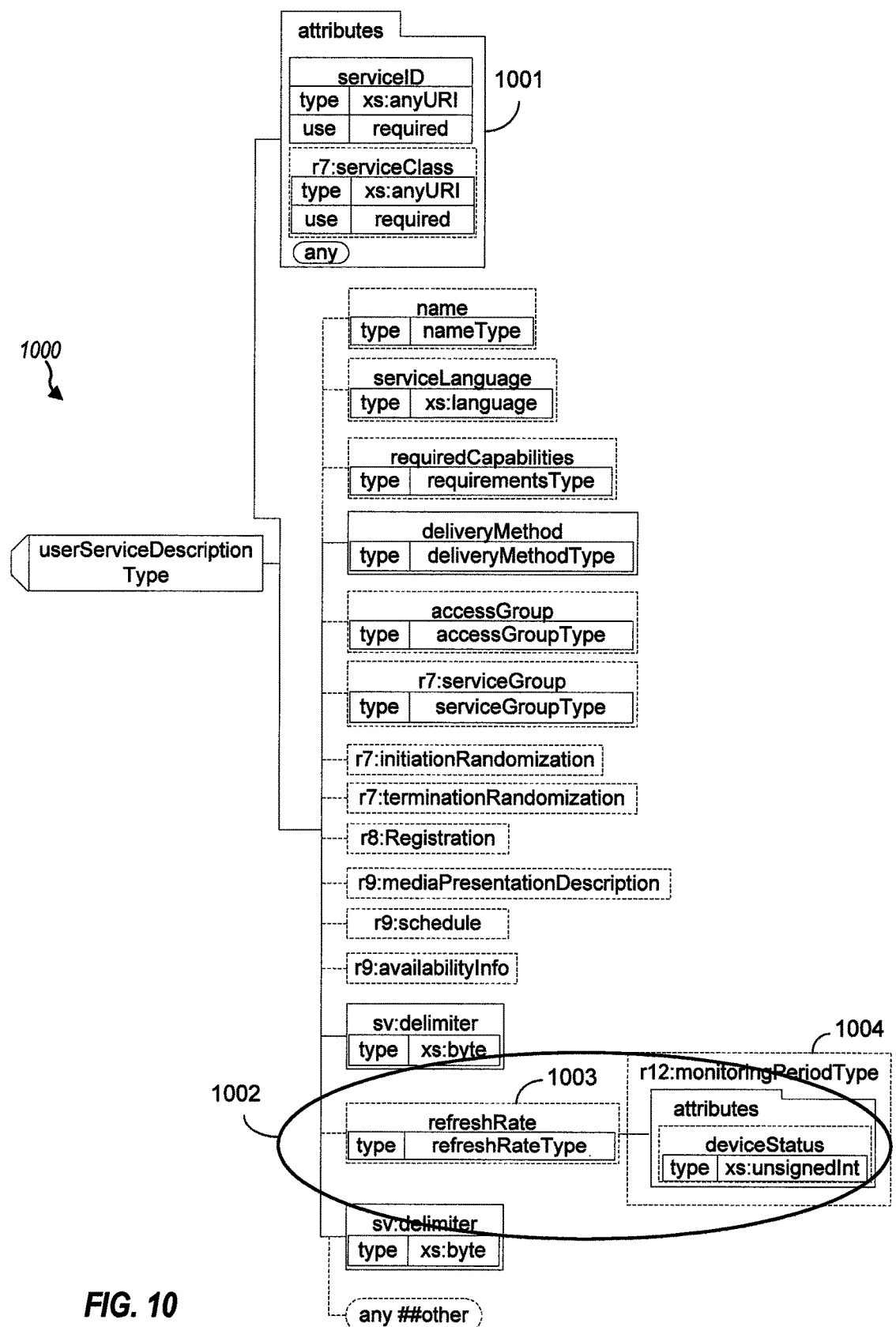
FIG. 10 is a diagram illustrating a service description file configured according to one aspect of the present disclosure.

FIG. 10 is a diagram illustrating a service description file configured according to one aspect of the present disclosure. In order to provide a more efficient means to request or retrieve the updated information, the broadcasting network may also include one or more refresh rates, monitoring period 1003 within the file describing a datacasting service with possibly a different refresh rate for different statuses of the UE or receiving device. The device status may be based on the types or categories of UEs for different applications running on the UEs. As different UEs with different status factors access the service description file to obtain information on accessing datacasting type 90, they will be able to obtain a refresh rate appropriate for its device status in order to intelligently set the rate at which it checks for updates in datacasting type 90.

In various aspects of the present disclosure, the UE may determine its own status and use its own status to select among one of the refresh rates for the datacasting service to set the delay time between successive accesses for updated data. In others of these aspects, the broadcast network may simply place the single estimated refresh rate into the service description file. In selected of these aspects, the UE will simply accept the refresh rate and use that rate to determine the delay time between successive accesses for updated data.

The status of a client device UE may include one or more different factors related to the type, activity, or state of the device. For example, the status may include the category of device, such as whether the device is a personal mobile phone or a dedicated mobile business access terminal. Status may also account for an application operating on the device. For example, if a traffic application is operating on a mobile device in which the traffic application accesses datacasting type 90 for traffic updates, the device status may include whether the application is running or not. The device status may also include a time of day, date, or even location. With reference again to the traffic application, the device status for the traffic application may change based on the time of day (e.g., rush hour or not), date (e.g., holiday or not), and location (e.g., is the device in a vehicle, near a highway, and the like). Additionally, the state of the device may affect the device status, for example if the battery level is very low, the device may determine its device status differently than with a full charge. Various numbers of factors may be considered when determining device status. Thus, depending on the device status, the UE may determine to access datacasting type 90 to update data at some multiple of the refresh rate.

In additional aspects of the present disclosure, the broadcasting network may generate multiple different refresh rates based, at least in part, on the estimated refresh rate. Each of the different refresh rates may correspond to a particular device status. Thus, multiple refresh rates may be stored in the service description file. As the different accessing devices retrieve the service description file, it may select its own refresh rate from the multiple different rates depending on its device status.

FIG. 10 is a diagram illustrating an evolved service description file 1000 configured according to one aspect of the present disclosure. Service description file 1000 may be generated using an organizational markup language, such as extensible markup language (XML), rich site summary (RSS), standard generalized markup language (SGML), or the like. It contains sets of information describing the attributes, access/transport parameters, and the like. For example, attributes block 1001 includes information identifying the service identifier (ID) and class. According to the various aspects of the present disclosure, evolved service description file 1000 includes monitoring block 1002. Monitoring block 1002 provides information including refresh rate category 1003 and device status category 1004. Refresh rate category 1003, as indicated, may include an array of any number of different refresh rates corresponding to a particular device status as provided in an array of device statuses in device status category 1004.

Referring back to FIGS. 8 and 9, UEs 900-902 each access a service description file, such as evolved service description file 1000, broadcast from BM-SC 812 to obtain the identification and access information, such as attributes block, in addition to the monitoring information of monitoring block 1002, including a refresh rate selected from refresh rate category 1003 according to its device status, as listed in device status category 1004. When each of UEs 900-902 access evolved service description file 1000, it will select a refresh rate based on its device status. For example, the device status of UE 900 reflects that it has a low battery level. Based on this device status, UE 900 selects refresh rate 906 identified in refresh rate category 1003, which does not attempt to access datacasting type 90 for updated data as often as the minimum refresh rate 903. UE 900 is, therefore, capable of conserving battery power while still obtaining some level of refreshed data.

UE 901 is a dedicated terminal that provide public access to the set of files carried by datacasting type 90. Accordingly, its device status reflects this device category. When UE 901 accesses evolved service description file 1000, it selects refresh rate 904 from refresh rate category 1003, which reflects a rate faster than minimum refresh rate 903. UE 902 is a consumer mobile phone with an application that uses the set of files broadcast by datacasting type 90. UE 902 selects refresh rate 905 from refresh rate category 1003 based on its device status. Refresh rate 905 is slightly longer than estimated refresh rate 903. Thus, the device category of UE 902 suggests that it is interested and capable of making regular accesses to datacasting type 90 for updated files, but does not require a rate as fast as estimated refresh rate 903.

In example operation of a broadcast service with references to FIGS. 8-10, content provider 814 supplies the broadcast content to BM-SC 812 through P-GW 810. A service description file, such as evolved service description file 1000, is provide by BM-SC 812 that defines not only the access information but also the monitoring information, such as monitoring block 1002 that includes the arrays of refresh rates in refresh rate category 1003 and device statuses in device status category 1004. After accessing evolved service description file 1000, as noted above, UEs 900-902 use the access information and selected refresh rates to obtain the broadcast data. For example, UE 900, with its selected refresh rate first tunes to datacasting type 90 and receives the first version of files for files 907. After receiving the broadcast files, UE 900 then tunes back to its other functions. It may enter idle mode or may access other data. However, it is tuned away from the frequency of datacasting type 90. When its timer expires corresponding to the selected refresh rate, it will again use the access information to tune to datacasting type 90. As UE 900 begins to receive the broadcast data, it will perform a check to determine if the data being received is updated or is still the previously received version of the data. As the next access period for UE 900 places it within the broadcasting period of the updated data in files 908, UE 900 continues receiving the broadcast data and, as before, tunes away when the complete set of files has been received. UE 900 will attempt to check whether it has received all of the set of files currently being broadcast. UEs 901 and 902 each have similar operations in accessing the broadcast information of datacasting type 90 according to their own selected refresh rates.

It should be noted that, in selected aspects of the present disclosure, when the UE attempts to determine whether there are new files to be accessed, many different processes may be used. For example, when the FLUTE transport protocols are used, the UE may detect whether new files are available for reception during the next access period determined according to the selected refresh rate using the FLUTE file delivery table (FTD), which includes the list of files and a checksum to signal the version changes. Accordingly, accordingly to such aspects, when the UE wakens after the refresh rate period and attempts to receive the broadcast data, it will check the FLUTE FTD and determine if the version currently being broadcast is later than its last received version. If the version is not new, the UE will discontinue receiving and begin the timer again for the next refresh rate period.

In another example of operation that may be illustrated with reference to FIGS. 8-10, datacasting type 90 may be a unicast transmission. In such an aspect, UE 901, for example, may communicate with BM-SC 812 to request transmission of the broadcast data directly to UE 901. UE 901 establishes connection to BM-SC 812 through eNB 804 and MBMS-GW 816, under control of MCE 806 and MME 808. After requesting access from BM-SC 812, UE 901 would access a service description file, such as evolved service description file 1000, through BM-SC 812 to obtain the necessary access and transport information and to select its refresh rate from refresh rate category 1003 based on the device status of UE 901. Thereafter, BM-SC 812 will transmit datacasting type 90 with a specific decoding for UE 901. When UE 901 tunes to the specific location and frequency of datacasting type 90, as indicated in evolved service description file 1000, at its selected refresh rate period, it will receive the unicast data of datacasting type 90, which for purposes of this additional example, is a unicast service.

Figures 11, 12:
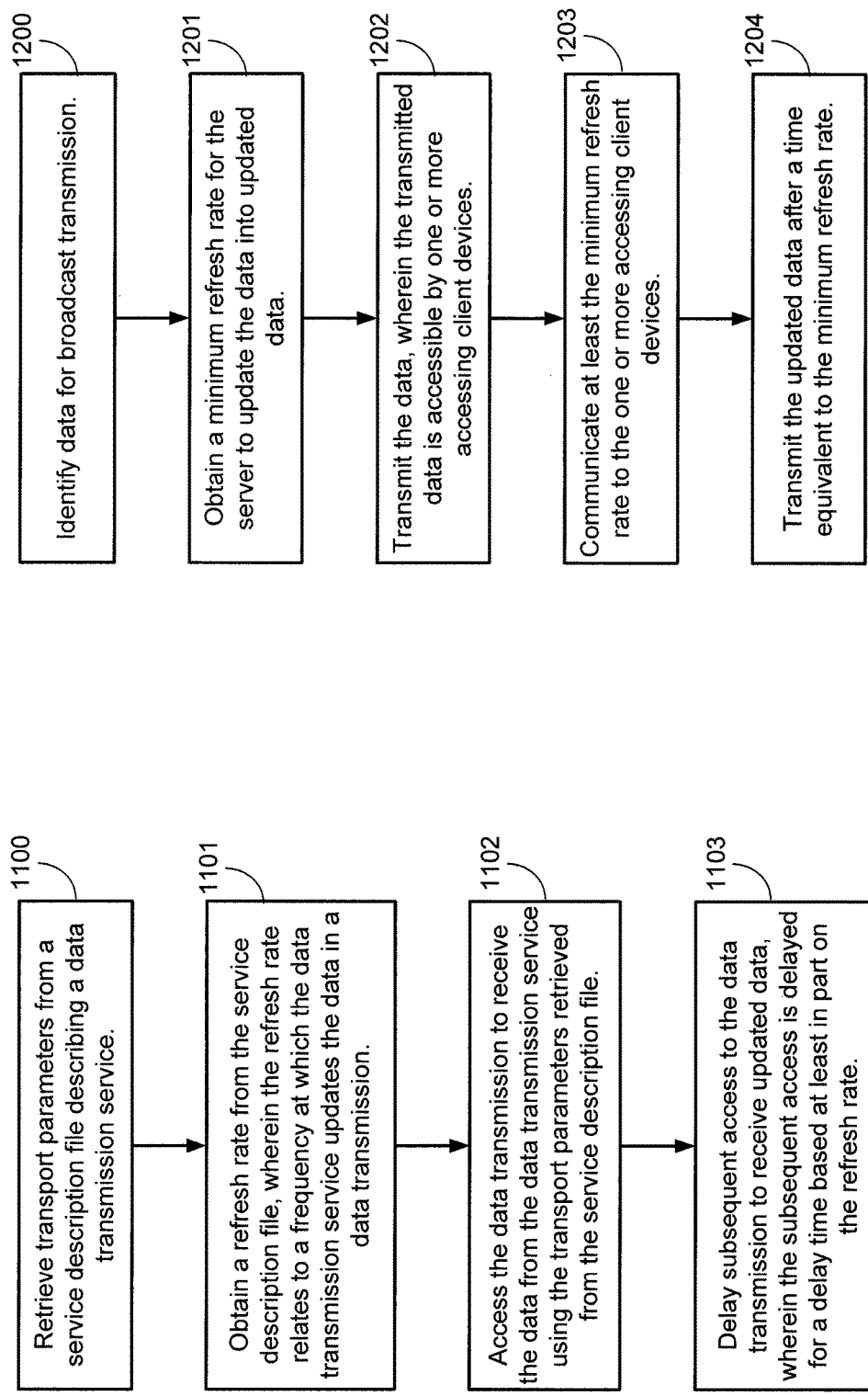
FIG. 11 is a functional block diagram illustrating example blocks executed to implement one aspect of the present disclosure.
FIG. 12 is a functional block diagram illustrating example blocks executed to implement one aspect of the present disclosure.

FIG. 11 is a functional block diagram illustrating example blocks executed to implement one aspect of the present disclosure. At block 1100, a client device retrieves transport parameters from a service description file describing a data transmission service. With additional references to FIGS. 5, 8, and 10, the client device may be UE 320, using the receiving components, such as antennas 552*a-r*, demodulator/modulators 554*a-r*, MIMO detector 556, and receive processor 558, all under control of controller/processor 580, UE 320 may tune to the frequency of a broadcast channel, broadcast from eNB 804, to which UE 320 may be in communication with. A service description file, such as evolved service description file 1000, may be maintained and broadcast separately from the data transmission service by BM-SC 816, through MBMS-GW 816 to eNB 804, under control and scheduling of MCE 806 and MME 808. The combination of these components and acts may provide means for retrieving transport parameters by a client device from a service description file describing a data transmission service.

At block 1101, the client device obtains a refresh rate from the service description file. The refresh rate relates to a frequency at which the data transmission service will update the data being transmitted. Using demodulator/modulators 554*a-r*, MIMO detector 556, and receive processor 558, under control of controller/processor 580, UE 320 processes the refresh rate from the received evolved service description file 1000. The combination of these components and acts may provide means for obtaining, by the client device, a refresh rate from the service description file, wherein the refresh rate relates to a frequency at which the data transmission service updates data in a data transmission provided by the data transmission service.

It should be noted that the client device, such as UE 320 may select from many possible refresh rates provided in refresh rates category 1003 of evolved service description file 1000. Using a device status, which UE 320 may determine based on a number of factors, including device type or category, an application being executed on UE 320, the battery power level, and the like. Using the device status, UE 320 may select a corresponding refresh rate from refresh rate category 1003 in evolved service description file 1000 in order to customize the monitoring and subsequent access attempts for updated data that allows for efficient data updates and battery power conservation.

At block 1102, the client device uses the transport parameters from evolved service description file 1000 to access the data transmission in order to receive the data from the data transmission service. UE 320, under control of controller/processor 580, retrieves the transport parameters from memory 582, which were obtained from evolved service description file 1000. Using these parameters, UE 320 tunes antennas 552a-r to the appropriate frequency or frequencies in order to access the data transmission containing the data from eNB 804. The combination of these components and acts may provide means for accessing the data transmission by the client device to receive the data from the data transmission service using the transport parameters retrieved from the service description file.

At block 1103, the client device delays subsequent access attempts to the data transmission for a delay period based on the refresh rate. UE 320 may have a timer process, which is well known in the art, controlled by controller/processor 580, which counts off the time equivalent to the refresh rate that was received from evolved service description file 1000. The combination of these components and acts may provide means for delaying subsequent access to the data transmission by the client device to receive updated data, wherein the subsequent access is delayed for a delay time based at least in part on the refresh rate.

FIG. 12 is a functional block diagram illustrating example blocks executed to implement one aspect of the present disclosure. At block 1200, a broadcast service identifies data for broadcast transmission. The broadcast service may be made up of a number of different entities. For example, with references to FIGS. 5, 8, and 10, the broadcast service may include the content provider 814 combined with the BM-SC 812. Content provider 814 selects the data for the broadcast service and sends that data to BM-SC 812 via P-GW 810. The combination of these components and acts may provide means for identifying, at a broadcast service, data for broadcast transmission.

At block 1201, the broadcast service obtains a minimum refresh rate for the service to update the data for the broadcast. The refresh rate corresponds to a frequency at which the broadcast service may update the data in for the broadcast. The minimum refresh rate may be may be assigned by the service or may be estimated based on the knowledge of how often the underlying data changes. Content provider 814 and BM-SC 812, in cooperation with MCE 806 and MME 808 may operate together to determine the minimum refresh rate. One or all of these entities may participate in determining the rate. The combination of these components and acts may provide means for obtaining a minimum refresh rate corresponding to a frequency at which the broadcast service updates the data into updated data.

At block 1202, the broadcast service transmits the data which will be accessible by one or more client devices. BM-SC 812, under control or management of MCE 806 and MME 808, will broadcast the identified data for the broadcast services. BM-SC 812 transmits the data to MBMS-GW 816, which will distribute the data to eNB 804 and UTRAN RNC 820 for further transmission in the location of any accessing client devices. The combination of these components and acts may provide means for transmitting the data by the broadcast service, wherein the transmitted data is accessible by one or more accessing client devices.

At block 1203, the broadcast service communicates at least the minimum refresh rate to the accessing devices. The communication of the refresh rate may be implemented by providing a service description service, such as evolved service description file 1000, that includes not only the transport parameters for identifying to the devices how to access the broadcast data, but also includes one or more refresh rates in refresh rate category 1003. When multiple refresh rates are provided in refresh rate category 1003, each such rate may correspond to a particular one of many device statuses in device status category 1004. Accessing devices will determine their device status and, based on the device status, select the appropriate corresponding refresh rate from refresh rate category 1003. Evolved service description file 1000 may be generated and stored by BM-SC 812 and transmitted as a datacasting announcement via a broadcast or announcement channel. Accessing devices would first tune to this announcement channel in order to obtain the transport parameters and select the appropriate refresh rate before accessing the broadcast or datacast data. BM-SC 812 would broadcast this evolved service description file 1000 to MBMS-GW 813 and on to eNB 804 and UTRAN RNC 820 for further broadcast in the locations of any accessing devices. The combination of these components and acts may provide means for communicating at least the minimum refresh rate to the one or more accessing client devices.

At block 1204, the broadcast service will update the data for the broadcast transmission no earlier than a time equivalent to the minimum refresh rate. Content provider 814 will submit data updates for the broadcast transmission to BM-SC 812 over P-GW 810. Either content provider 814 may keep track of the minimum refresh time before transmitting the updates to BM-SC 812 or BM-SC 812 may track the refresh time in order to update the broadcast transmission no more often that the time equivalent to the minimum refresh rate. The combination of these components and acts may provide means for transmitting the updated data by the broadcast service after a time equivalent to the minimum refresh rate.

Various aspects of the present disclosure may also be used for unicast services. In such aspects, the client device would access the service announcement, perhaps by accessing the service description file, and then request the data from the broadcasting service. The broadcasting service would then transmit the data in the broadcast in response to the request.

FIG. 13 is a functional block diagram illustrating example blocks executed to implement one aspect of the present disclosure. At block 1300, a client computing device transmits a request to a remote server for data. With reference to FIGS. 1 and 5, a client computing device may include client device 102 and UE 320. Client device 102 stores a client application, APP 112, in memory 108, which, when executed by processor 107, operates as the client in a client-server relationship with a remote server. Similarly, UE 320 may include an application (not shown) in memory 582, which, when executed by controller/processor 580, operates as the client in client-server relationship in which the remote server is accessed through a WWAN environment, such as an LTE network, or the like. The client application, APP 112, of client device 102 would form a request for data and transmit this request over an IP network, such as Internet 101, through NIC 110 to server 100. The client application of UE 320 would also formulate a request for data. Under control of controller/processor 580, UE 320 would transmit the request to server 100 over the IP network using transmit processor 564, TX MIMO processor 566, demodulator/modulators 554*a-r* and antennas 552*a-r*. The combination of these components and acts may also provide means for transmitting a request from a client computing device to a remote server for data.

At block 1301, the client computing device receives the data in response to the request. The requested data is received from the remote server. For client device 102, the data arrives from server 100 over Internet 101 through NIC 110. Processor 107, operating APP 112, processes the data in the application environment of APP 112. Similarly, UE 320 receives the data from server 100 over Internet 101 and the WWAN network arriving through antennas 552*a-r*, demodulator/modulators 554*a-r*, MIMO detector 556, receive processor 558, each under control of controller/processor 580. The received data will then also be processed within the operational environment created through the execution of the application by controller/processor 580. The combination of these components and acts may also provide means for receiving the requested data at the client computing device in response to the request.

At block 1302, the client computing device obtains a refresh rate related to an estimated refresh rate at which the remote server refreshes the data. The refresh rate obtained by the client computing device may be obtained out-of-band from a separate information location, such as a broadcast service advertisement or information element. The refresh rate may also be equivalent to the estimated refresh rate determined by the remote server or a different rate that is based on the device status. The device status may be various states or functional attributes of the device, such as a device category, device type, an application status of an application operating on the client device, a time of day, battery level, or even a location of the client device.

In an example related to client device 102, when receiving an assignment from server 100, the assigned refresh rate is obtained by receiving the refresh rate 109 over Internet 101 through NIC 110. Processor 107 then stores refresh rate 109 into memory 108. For aspects in which client device 102 accesses a separate information element, APP 112, through execution by processor 107, transmits an access signal through NIC 110 over Internet 101, that retrieves the information elements relating to the data from server 100 or even a separate server (not shown) that may carry these information elements. The refresh rate, within the information elements, would be received over Internet 101 and through NIC 110.

For aspects operating related to UE 320, the assigned refresh rate would be received through antennas 552*a-r*, demodulator/modulators 554*a-r*, MIMO detector 556, receive processor 558, each under control of controller/processor 580. Controller/processor 580 would store this refresh data to memory 582, similarly to refresh rate 109 stored in memory 108 of client device 102. The combination of these components and acts may also provide means for obtaining a refresh rate at the client computing device related to an estimated refresh rate at which the remote server refreshes the data.

At block 1303, the client computing device delays its next request transmission to the remote server for refreshed data, wherein the next request transmission is delayed for a delay time based at least in part on the refresh rate. Instead of simply sending update requests for the refreshed data at a standard, pre-defined rate, the client computing device will use a delay time that is intelligently based on the refresh rate. Because the refresh rate will take into account the estimated refresh rate of the remote server and may also take into account the device status of the client device, the power and bandwidth use of the client computing device may be more efficiently managed.

In an example related to client device 102, using refresh rate 109, in memory 108, processor 107, executing APP 112, will not send the next request for the updated data until the delay time has run. The delay time, which is based on the refresh rate, may be used in a timer, such as timer 111 to delay sending the next request. The next request would be sent as the previous request, through NIC 110 over Internet 101 to server 100. For example aspects operating with UE 320, controller/processor 580, executing the client application in memory 582, will delay transmitting the next request until the delay time has expired. UE 320 may also include a timer, such as timer 111 in client device 102, to monitor the delay time under control of controller/processor 580. The next request would be sent to remote server 100 over the IP network using transmit processor 564, TX MIMO processor 566, demodulator/modulators 554*a-r* and antennas 552*a-r*. The combination of these components and acts may also provide means for delaying a next request transmission from the client computing device to the remote server for refreshed data, wherein the next request transmission is delayed for a delay time based at least in part on the refresh rate.

FIG. 14 is a functional block diagram illustrating example blocks executed to implement one aspect of the present disclosure. At block 1400, a server identifies data for electronic publication. As noted, for purposes of this disclosure, electronic publication of data includes various methods or means for providing access to various types and quantities of data. For example, data intended for a website, including logic, HTML data, and the like are electronically published when placed into an operational web server that is accessible by a client web browser. Data intended for remote applications running on various computing devices, mobile devices, or handsets are also electronically published when the data is made available and accessible on an electronic server by such computing devices, mobile devices, or handsets. Referring to FIGS. 1 and 5, a remote server 100 identifies data 113 stored in memory 104 that it intends to electronically publish by providing access points to various client computing devices, such as client device 102, UE 320, and the like. The combination of these components and acts may provide means for identifying, at a server, data for electronic publication.

At block 1401, the server estimates a minimum refresh rate to refresh the data into updated data. As new data arrives at the server for updating the data to be published or as new data is processed or images move, the server will update the data to be published and make this updated data available to the accessing clients. The server may observe how often such data is received or processed and calculate an estimate of the minimum refresh rate. In example operations with server 100, processor 103 monitors the data 113 and either incoming data for updating that is received over Internet 101 through NIC 106 or that it processes and calculates estimated refresh rate 105. Processor 103 stored estimated refresh rate 105 into memory 104. The combination of these components and acts may provide means for estimating a minimum refresh rate for the server to refresh the data into updated data.

At block 1402, the server electronically publishes the data, wherein the electronically published data is accessible by one or more accessing client computing devices. With regard to server 100, once data 113 is ready for access, server 100, under control of processor 103, places data 113 into an accessible location in memory 104. The accessible location may be accessed, so that data 113 may be retrieved, by various client computing devices, such as client device 102, UE 320, and the like. The combination of these components and acts may provide means for electronically publishing the data by the server, wherein the electronically published data is accessible by one or more accessing client computing devices.

At block 1403, the server communicates at least the minimum refresh rate to the one or more accessing client computing devices. Regarding the example operation of server 100, in some aspects, server 100 may directly transmit estimated refresh rate 105 to the access client computing devices, such as client device 102, UE 320, or the like, through NIC 106 over Internet 101. In order to reach UE 501, server 100 would address estimated refresh rate 105 to be carried over the WWAN network to UE 320. In additional aspects, server 100 may use estimated refresh rate 105 to generate a number of different refresh rates that may be communicated in a separate information element or broadcast service advertisement. These different refresh rates may be generated based on various device statuses, such that the refresh rate used by any particular accessing client device may correspond to its device status. The combination of these components and acts may provide means for communicating at least the minimum refresh rate to the one or more accessing client computing devices.

At block 1404, the server will then electronically publish the updated data after a time equivalent to the minimum refresh rate. Once server 100 has determined the estimated refresh rate 105, it will attempt to update data to data 113 no earlier than the estimated minimum. It may update at a later time resulting in a slower refresh rate. However, since the refresh rates used by the accessing client computing devices, such as client device 102, UE 320, and the like, may be based, at least in part, on the minimum refresh rate, as long as server 100 does not update earlier than the estimated minimum rate, the accessing clients are less likely to miss updated data. Processor 103 may operate a timer 114 in order to keep track of the timing at which it will publish the updates to data 113. Timer 114 may be set equivalent to estimated refresh rate 105, as stored in memory 104. The combination of these components and acts may provide means for electronically publishing the updated data by the server after a time equivalent to the minimum refresh rate.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 11-14 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of distributed computing, comprising:
accessing, by a client device, on a first channel, a remote server to obtain a service description file stored on the remote server, the service description file describing a data transmission service;
retrieving transport parameters by the client device from the service description file, wherein the data transmission service broadcasts, at a periodic interval on a second channel, a set of data stored in a server;
obtaining, by the client device, a refresh rate from the service description file, wherein the refresh rate relates to a frequency at which the data transmission service updates the data in the set of data in the server to be used for the data transmission, wherein the obtaining includes selecting the refresh rate from a plurality of refresh rates contained in the service description file, wherein the selecting is based on a device status;
accessing the broadcast of the data transmission service, by the client device, to receive the set of data from the data transmission service using the transport parameters retrieved from the service description file, wherein the first channel is separate from the second channel; and
delaying subsequent access to the broadcast of the data transmission service, by the client device, to receive updated data, wherein the subsequent access is delayed for a delay time based at least in part on the refresh rate.

2. The method of claim 1, further comprising:
initiating a timer at the client device in response to obtaining the refresh rate, wherein the timer is set to the delay time, and
wherein the timer times the delay time before the subsequent access is attempted by the client device.

3. The method of claim 1, further comprising:
subsequently accessing the broadcast of the data transmission service after the delay time;
determining whether the data in the set of data in the broadcast of the data transmission service has been updated;
retrieving updated data from the broadcast of the data transmission service in response to determining that the data in the set of data has been updated; and
ceasing access to the broadcast of the data transmission service and further delaying subsequent access for the delay time in response to determining that the data in the set of data has not been updated.

4. The method of claim 1, further comprising:
determining, by the client device, the device status, wherein the device status comprises one or more of:
a device category;
a device type;
an application status of an application operating on the client device;
a time of day;
a battery level of the client device; and
a location of the client device; and
selecting a device refresh rate based on the device status.

5. The method of claim 4, wherein the delay time is further based at least in part on the device refresh rate.

6. The method of claim 1, further comprising:
receiving the service description file over a broadcast channel.

7. The method of claim 1, further comprising:
transmitting a request from the client device to data transmission service for retrieving the set of data provided by the data transmission service, wherein the data transmission service transmits the set of data in the broadcast of the data transmission service in response to the request.

8. A computer program product for wireless communications in a wireless network, comprising:
a non-transitory computer-readable medium having program code recorded thereon, the program code including:
program code to access, on a first channel, a remote server by a client device to obtain a service description file stored on the remote server, the service description file describing a data transmission service;
program code to transport parameters by the client device from the service description file, wherein the data transmission service broadcasts, at a periodic interval on a second channel, a set of data stored in a server;
program code to obtain, by the client device, a refresh rate from the service description file, wherein the refresh rate relates to a frequency at which the data transmission service updates the data in the set of data in the server to be used for the data transmission, wherein the program code to obtain includes program code to select the refresh rate from a plurality of refresh rates contained in the service description file based on a device status;
program code to access, on the second channel, the broadcast of the data transmission service, by the client device, to receive the set of data from the data transmission service using the transport parameters retrieved from the service description file, wherein the first channel is separate from the second channel; and
program code to delay subsequent access to the broadcast of the data transmission service, by the client device, to receive updated data, wherein the subsequent access is delayed for a delay time based at least in part on the refresh rate.

9. The computer program product of claim 8, further comprising:

program code to initiate a timer at the client device in response to execution of the program code to obtain the refresh rate, wherein the timer is set to the delay time, and wherein the timer times the delay time before the subsequent access is attempted by the client device.

10. The computer program product of claim 8, further comprising:

program code to subsequently access the broadcast of the data transmission service after the delay time;

program code to determine whether the data in the set of data in the broadcast of the data transmission service has been updated;

program code to retrieve updated data from the broadcast of the data transmission service in response to determining that the data in the set of data has been updated; and program code to cease access to the broadcast of the data transmission service and further delaying subsequent access for the delay time in response to determining that the data in the set of data has not been updated.

11. The computer program product of claim 8, further comprising:

program code to determine, by the client device, the device status, wherein the device status comprises one or more of:
a device category;
a device type;
an application status of an application operating on the client device;
a time of day;
a battery level of the client device; and
a location of the client device; and program code to select a device refresh rate based on the device status.

12. The computer program product of claim 11, wherein the delay time is further based at least in part on the device refresh rate.

13. The computer program product of claim 8, further comprising:

program code to receive the service description file over a broadcast channel.

14. A client device configured for wireless communication, the client device comprising:
at least one processor; and
a memory coupled to the at least one processor,
wherein the at least one processor is configured:
to access a remote server, on a first channel, by the client device to obtain a service description file stored on the remote server, the service description file describing a data transmission service;
to retrieve transport parameters by the client device from the service description file, wherein the data transmission service broadcasts, at a periodic interval on a second channel, a set of data stored in a server;
to obtain, by the client device, a refresh rate from the service description file, wherein the refresh rate relates to a frequency at which the data transmission service updates the data in the set of data in the server to be used for the data transmission, wherein the configuration of the at least one processor to obtain includes configuration of the at least one processor to select the refresh rate from a plurality of refresh rates contained in the service description file based on a device status;

to access the broadcast of the data transmission service, on the second channel, by the client device to set of data from the data transmission service using the transport parameters retrieved from the service description file, wherein the first channel is separate from the second channel; and to delay subsequent access to the broadcast of the data transmission service, by the client device, to receive updated data, wherein the subsequent access is delayed for a delay time based at least in part on the refresh rate.

15. The client device of claim 14, wherein the at least one processor is further configured:
to initiate a timer at the client device in response to the obtaining the refresh rate, wherein the timer is set to the delay time, and
wherein the timer times the delay time before the subsequent access is attempted by the client device.

16. The client device of claim 14, wherein the at least one processor is further configured:
to subsequently access the broadcast of the data transmission service after the delay time;
to determine whether the data in the set of data in the broadcast of the data transmission service has been updated;
to retrieve updated data from the broadcast of the data transmission service in response to determining that the data in the set of data has been updated; and
to cease access to the broadcast of the data transmission service and further delaying subsequent access for the delay time in response to determining that the data in the set of data has not been updated.

17. The client device of claim 14, wherein the client device comprises one or more of:
a mobile device configured for wireless communication in a wireless wide area network (WWAN);
a mobile device configured for wireless communication in a wireless local area network; and
a computing device coupled to a local area network (LAN).

18. The client device of claim 17, wherein the at least one processor is further configured:
to determine, by the client device, the device status, wherein the device status comprises one or more of:
a device category;
a device type;
an application status of an application operating on the client device;
a time of day;
a battery level of the client device; and
a location of the client device; and
to select a device refresh rate based on the device status.

19. The client device of claim 18, wherein the delay time is further based at least in part on the device refresh rate.

20. The client device of claim 14, wherein the at least one processor is further configured:
to receive the service description file over a broadcast channel.

21. The client device of claim 14, wherein the at least one processor further being configured:
to transmit a request from the client device to data transmission service for retrieving the set of data provided by the data transmission service, wherein the data transmission service transmits the set of data in the broadcast of the data transmission service in response to the request.

22. The client device of claim 21, wherein the remote server is located in a broadcast broadcast-multicast service center (BM-SC).

23. An apparatus configured for wireless communication, the apparatus comprising:
at least one processor; and
a memory coupled to the at least one processor,
wherein the at least one processor is configured:
to identify, by a broadcast service, data at a server of the broadcast service for broadcast transmission;
to obtain a minimum refresh rate corresponding to a frequency at which the broadcast service updates the data at the server into updated data, wherein the minimum refresh rate is determined based on a time required for transmitting the data at a data rate allocated for transport to the broadcast service;
to transmit the data from the server by the broadcast service, wherein the transmitted data is accessible by one or more accessing client devices;
to communicate at least the minimum refresh rate to the one or more accessing client devices;
to transmit the updated data by the broadcast service after a time equivalent to the minimum refresh rate; and
to determine, by the broadcast service, a plurality of device refresh rates, wherein each of the plurality of device refresh rates identifies a different rate at which an accessing client device may request access to the updated data, wherein one of the plurality of device refresh rates corresponds to the minimum refresh rate, wherein each of the plurality of device refresh rates corresponds to a device status, wherein each device refresh rate in the plurality of device refresh rates is different from every other device refresh rate in the plurality of device refresh rates.

24. The apparatus of claim 23, wherein the device status comprises one or more of:
a device category of the accessing client device;
a device type of the accessing client device;
an application status of an application operating on the accessing client device;
a time of day;
a battery level of the accessing client device; and
a location of the accessing client device.

25. The apparatus of claim 24, wherein the at least one processor is further configured:
to identify, by the broadcast service, a device status of the accessing client device;
to select, by the broadcast service, an assigned device refresh rate from the plurality of device refresh rates based on the identified device status; and
to communicate the assigned device refresh rate to the accessing client device.

26. The apparatus of claim 24, wherein the at least one processor is further configured:
to broadcast transport parameters for the transmitted data and the plurality of device refresh rates in a service description file related to the transmitted data, wherein the service description file is separate from the broadcast service.

27. The apparatus of claim 23, wherein the at least one processor is further configured:
to receive a request from a client device of the one or more accessing client devices to receive the data, wherein the data is transmitted in response to receiving the request.

28. The method of claim 1, wherein the service description file is broadcast at a periodic interval on the first channel.

29. The method of claim 1, wherein receiving, by the client device, the set of data from the data transmission service requires a subscription to the data transmission service.

30. The computer program product of claim 8, wherein the service description file is broadcast at a periodic interval on the first channel.

31. The computer program product of claim 8, wherein receiving, by the client device, the set of data from the data transmission service requires a subscription to the data transmission service.

32. The client device of claim 14, wherein the service description file is broadcast at a periodic interval on the first channel.

33. The client device of claim 14, wherein receiving, by the client device, the set of data from the data transmission service requires a subscription to the data transmission service.

* * * * *